United States Patent [19]

Bhanu et al.

[11] Patent Number: 5,048,095

[45] Date of Patent: Sep. 10, 1991

[54] ADAPTIVE IMAGE SEGMENTATION SYSTEM

[75] Inventors: Bir Bhanu, New Brigton; Sungkee Lee, St. Paul; John C. Ming, Coon Rapids, all of Minn.

[73] Assignee: Honeywell Inc., Minneapolis, Minn.

[21] Appl. No.: 502,603

[22] Filed: Mar. 30, 1990

[51] Int. Cl.$^5$ .............................................. G06K 9/34
[52] U.S. Cl. ......................................... 382/9; 382/15; 364/513
[58] Field of Search ...................... 364/513; 382/9, 48, 382/14, 15

[56] References Cited

U.S. PATENT DOCUMENTS

| | | | |
|---|---|---|---|
| 4,697,242 | 9/1987 | Holland et al. | 364/513 |
| 4,764,971 | 8/1988 | Sullivan | 382/9 |
| 4,803,736 | 2/1989 | Grossberg et al. | 382/22 |
| 4,821,333 | 4/1989 | Gillies | 382/49 |
| 4,845,610 | 7/1989 | Parvin | 364/200 |
| 4,932,065 | 6/1990 | Feldagajer | 382/9 |

OTHER PUBLICATIONS

G. E. Liepins & M. R. Hilliard, "Genetic Algorithms: Foundations & Applications", Anna ls of Operations Research, 21, (1989), pp. 31–58.

J. M. Fitzpatrick, J. J. Grefenstette & D. Van Gucht, "Image Registration by Genetic Search", Conf. Proc., IEEE Southeastcon 1984, pp. 460–464.

A. D. McAulay & J. C. Oh, "Image Learning Classifier System Using Genetic Algorithms", IEEE Proc. of the National Aerospace & Electronics Conference, vol. 2, 1989, pp. 705–710.

*Primary Examiner*—Leo H. Boudreau
*Assistant Examiner*—Barry Stellrecht
*Attorney, Agent, or Firm*—John G. Shudy, Jr.

[57] ABSTRACT

An adaptive segmentation system that utilizes a genetic algorithm in image segmentation. The system incorporates a closed-loop feedback mechanism in the segmentation/learning cycle. The system can adapt to changes appearing in the images being segmented, caused by variations of such factors as time and weather. Adaptation is achieved with a measure based on differences of analyzed past imagery and current imagery and on the criteria for segmentation quality. The invention is not dependent on any particular segmentation algorithm or specific sensor type.

8 Claims, 9 Drawing Sheets

ADAPTIVE IMAGE SEGMENTATION SYSTEM

FIELD OF THE INVENTION

The present invention pertains to image processing and particularly to image segmentation. More particularly, the invention pertains to adaptive image segmentation.

BACKGROUND OF THE INVENTION

Image segmentation is typically the first, and most difficult, task of any automated image understanding process. Segmentation refers to grouping of parts of an image that have "similar" image characteristics. All subsequent interpretation tasks, such as feature extraction, object detection, and object recognition, rely heavily on the quality of the segmentation process. Despite the large number of segmentation methods presently available, no general-purpose methods have been found which perform adequately across a diverse set of imagery. To date, the only effective method of using a given segmentation process is to manually modify the algorithm's control parameters until adequate results are achieved. Only after numerous modifications to an algorithm's control parameter set can any current segmentation technique be used to process the wide diversity of images encountered in real world applications such as the operation of an autonomous robotic land vehicle or aircraft, automatic target recognizer, or a photointerpretation task.

When presented with an image from one of these application domains, selecting the appropriate set of algorithm parameters is the key to effectively segmenting the image. The image segmentation problem can be characterized by several factors which make parameter selection process very difficult. First, most of the powerful segmentation methods available today contain numerous control parameters which must be adjusted to obtain optimal or peak performance. As an example, the Phoenix segmentation algorithm contains 14 separate control parameters that directly affect the segmentation results. (The Phoenix algorithm is described in "The Phoenix Image Segmentation System: Description and Evaluation," *SRI International Technical Note No. 289*, December, 1982.) The size of the parameter search space in these systems can be prohibitively large unless it is traversed in a highly efficient manner. Second, the parameters within most segmentation algorithms typically interact in a complex, non-linear fashion, which makes it difficult or impossible to model the parameters' behavior in an algorithmic or rule-based fashion. Thus, the multidimensional objective function which results from and defined by various parameter combinations generally cannot be modeled in a mathematical way. Third, since variations between images cause changes in the segmentation results, the objective function varies from image to image. The search method used to optimize the objective function must be able to adapt to these variations between images. Finally, the definition of the objective function itself can be subject to debate because there are no single, universally accepted measures of segmentation performance available with which to efficiently define the quality of the segmented image.

Known search and optimization techniques or methodologies which attempt to modify segmentation parameters have various drawbacks. For instance, exhaustive techniques (e.g., random walk, depth first, breadth first, enumerative) are able to locate global maximum but are computationally prohibitive because of the size of the search space.

Calculus-based techniques (e.g., gradient methods, solving systems of equations) have no closed form mathematical representation of the objective function available. Discontinuities and multimodal complexities are present in the objective function.

Partial knowledge techniques (e.g., hill climbing, beam search, best first, branch and bound, dynamic programming, A*) are inadequate. Hill climbing is plagued by the foothill, plateau, and ridge problems. Beam, best first, and A* search techniques have no available measure of goal distance. Branch and bound requires too many search points while dynamic programming suffers from the curse of dimensionality.

Knowledge-based techniques (e.g., production rule systems, heuristic methods) have a limited domain of rule applicability, tend to be brittle, and are usually difficult to formulate. Further, the visual knowledge required by these techniques may not be representable in knowledge-based formats.

Hence, a need exists to apply a technique that can efficiently search the complex space of plausible parameter combinations and locate the values which yield optimal results. The approach should not be dependent on the particular application domain nor should it have to rely on detailed knowledge pertinent to the selected segmentation algorithm. Genetic algorithms, which are designed to efficiently locate an approximate global maximum in a search space, have the attributes described above and show great promise in solving the parameter selection problem encountered in the image segmentation task.

Genetic algorithms are able to overcome many of the problems mentioned in the above optimization techniques. They search from a population of individuals (search points), which make them ideal candidates for parallel architecture implementation, and are far more efficient than exhaustive techniques. Since they use simple recombinations of existing high quality individuals and a method of measuring current performance, they do not require complex surface descriptions, domain specific knowledge, or measures of goal distance. Moreover, due to the generality of the genetic process, they are independent of the segmentation technique used, requiring only a measure of performance for any given parameter combination. Genetic algorithms are also related to simulated annealing where, although random processes are also applied, the search method should not be considered directionless. In the image processing domain, simulated annealing has been used to perform image restoration and segmentation. Simulated annealing and other hybrid techniques have the potential for improved performance over earlier optimization techniques.

SUMMARY OF THE INVENTION

This invention makes use of a machine learning method known as a genetic algorithm to facilitate adaptation in a image segmentation process. Specifically, the genetic algorithm allows the segmentation algorithm to overcome changes in image characteristics caused by variable environmental conditions such as time of day, time of year, clouds, rain, haze, and shadows.

Genetic algorithms have demonstrated their capability in efficiently locating an approximate global maxima in applications such as function optimization, and thus can be used to search the complex space of plausible control parameter settings and locate the parameter combination which yields optimal results. The present invention is the first known application of a genetic algorithm in the domain of image segmentation. The invention differs from other proposed adaptive segmentation systems since it incorporates a closed-loop feedback mechanism in the segmentation/learning cycle. This cycle contains the genetic learning system, the image segmentation algorithm, and the segmentation evaluation process.

The genetic process traverses the complex parameter search space by maintaining a population of high-quality parameter sets. During each iteration of the segmentation/learning cycle, known as a generation, individual parameter sets are combined on the basis of their strength or fitness. The combination of existing parameter sets, referred to as the reproduction operation, is accomplished using one or more genetic operators such as crossover or mutation. By combining the properties of highly fit parameter sets, the genetic algorithm functions as a "global force" that shifts attention to productive, high quality regions in the search space.

The properties of the input image are characterized using several different methods of analysis. External image characteristics (time of day, cloud cover, and other environmental factors) as well as internal image statistics (first order properties, second order properties, and histogram data) are utilized to characterize the image. This information is used by the genetic learning system to select a group of parameter sets from previous image processing sessions that most closely align with the current image properties.

The adaptive process is extensible to any segmentation algorithm whose results can be modified through the use of control parameters. The invention uses, for example, the Phoenix segmentation algorithm since it works well with general-purpose color imagery.

In order to close the feedback loop, a segmentation evaluation component is used to supply the necessary "reward" to the genetic learning system. Just as there is no single segmentation algorithm which works in all cases, there exist no measure of segmentation quality that yields valid results in all cases. Thus, the present invention includes a series of segmentation quality measures that use both object-specific and object-independent evaluation methods. This information is combined using a weighted sum method to determine the overall segmentation quality.

The adaptive image segmentation system can dynamically adapt to the images as they are acquired. For the best combination of control parameters, object regions are analyzed to determine properties such as contrast and edge/border coincidence. The extracted properties of the current image regions are compared with the properties obtained so far by the image segmentation system. The reward in the feedback loop is proportional to the similarity between the characteristics of the extracted targets and the characteristics of the past-observed images.

BRIEF DESCRIPTION OF THE DRAWINGS

FIG. 3 is a graph of the quality surface of the image in FIG. 1a.

FIG. 5 shows the format for stating the image statistics and external variables extracted from the image in FIG. 1a.

DESCRIPTION OF THE PREFERRED EMBODIMENT

Figure 1A:
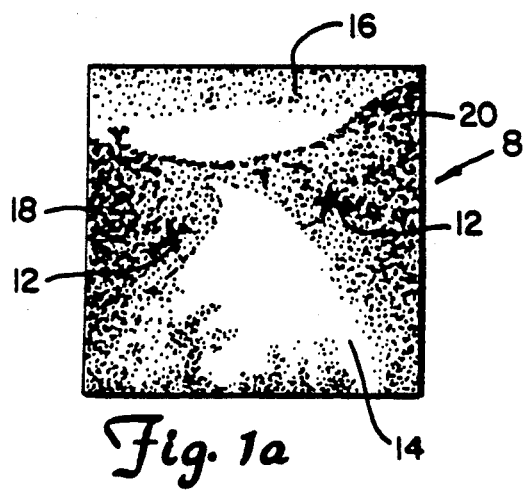
FIG. 1a is an image submitted for segmentation.
Figure 1B:
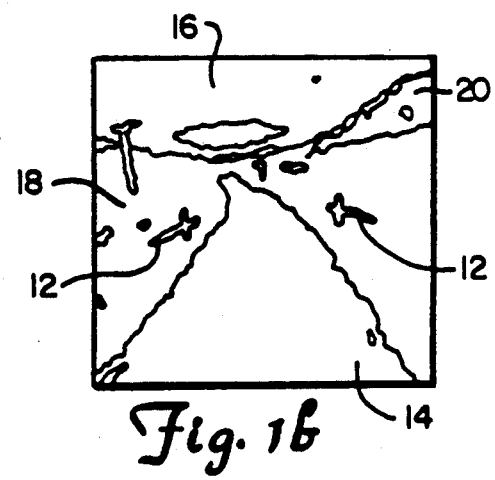
FIGS. 1b-1f are images at various segmentation levels.
Figure 1C:
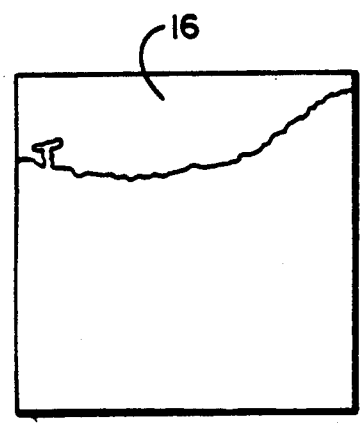
Figure 1D:
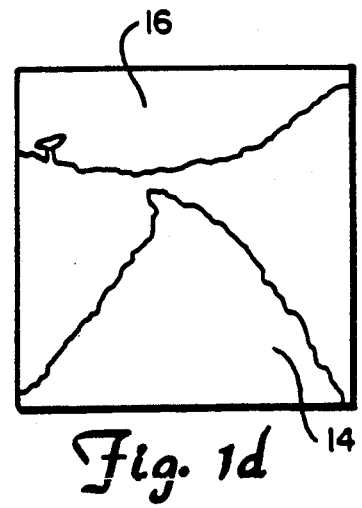
Figure 1E:
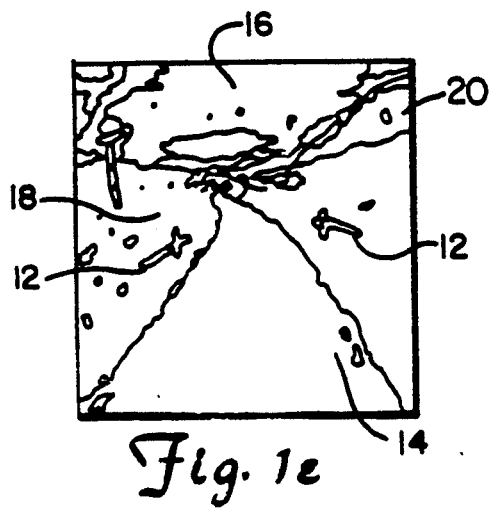
Figure 1F:
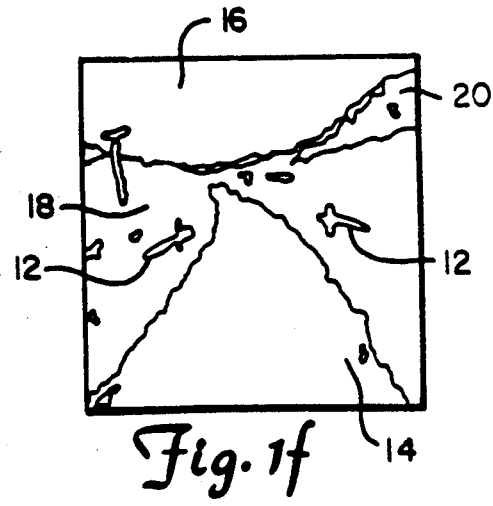

FIGS. 1a-1f illustrate an adaptive image segmentation task. FIG. 1a shows an original image 8 that must be segmented by the system. Gates 12 adjacent to road 14 need to be segmented. FIG. 1b indicates the "ideal" segmentation of image 8 in which gates 12 on either side of road 14 are properly segmented, along with the other main regions of image 8 (e.g., road 14, sky 16, fields 18, mountains 20, etc.). The segmentation in FIG. 1b was obtained manually. The genetic process converges on this ideal segmentation result through successive iterations. FIG. 1c shows an initial image 8 that is grossly undersegmented. FIG. 1d identifies the main regions in image 8, although gates 12 are not evident. This figure lacks sufficient details. FIG. 1e oversegments image 8 by identifying too many irrelevant small regions. However, gate 12 regions have been obtained. The final result, shown in FIG. 1f, eliminates most of the small regions while leaving gate regions 12 intact. In other words, gates 12 are properly extracted and other main image regions are correctly segmented. FIGS. 1a-1f illustrate the iterative, convergent nature of the genetic process towards ideal segmentation results.

Figure 2:
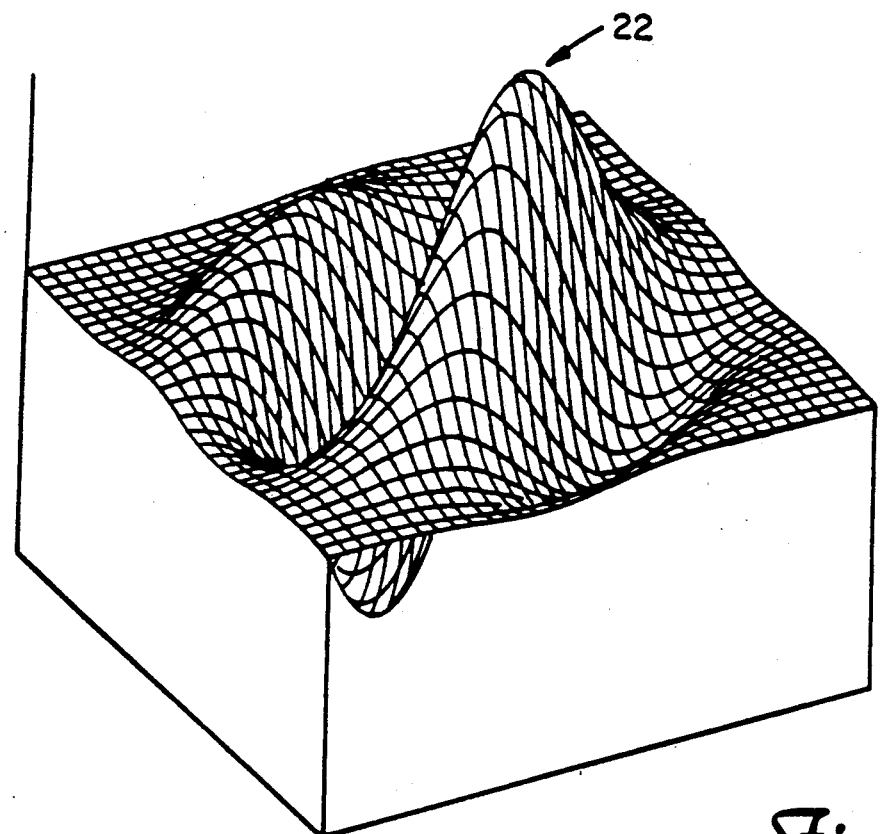
FIG. 2 is a representation of an objective function which is to be optimized in adaptive image segmentation.
Figure 3:
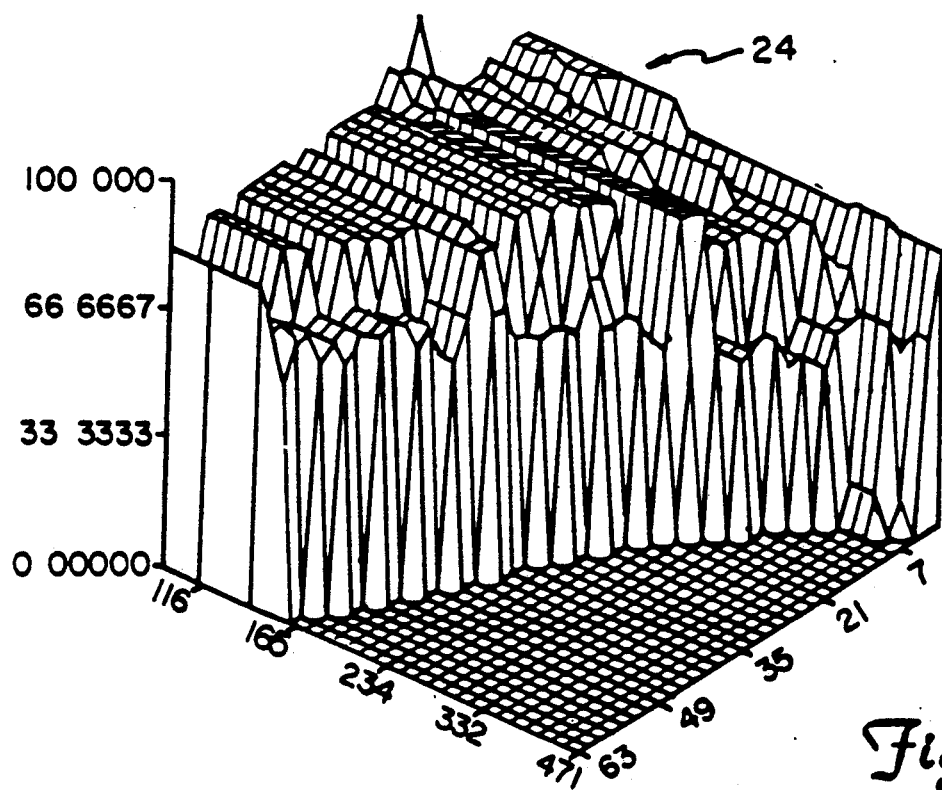

FIG. 2 provides a generalized representation 22 of an objective function that is typical of and needs to be optimized for the image segmentation process. FIG. 3 shows a quality surface 24 for the image shown in FIG. 1a. The contours of surface 24 indicate the complex interactions between the control parameters. "Maxmin" and "hsmooth" are Phoenix algorithm parameters. An analysis of surfaces 22 and 24 in FIGS. 2 and 3 indicates a need to utilize a highly effective search strategy which can withstand the breadth of performance requirements necessary for the image segmentation task.

Genetic algorithms are known in art. The term genetic algorithm is derived from the fact that its operations are loosely based on the mechanics of genetic adaptation in biological systems. Genetic algorithms can be briefly characterized by three main concepts: a Darwinian notion of fitness or strength which determines an individual's likelihood of affecting future generations through reproduction; a reproduction operation which produces new individuals by combining selected members of the existing population; and genetic operators which create new offspring based on the structure of their parents.

A genetic algorithm maintains a constant-sized population of candidate solutions, known as individuals. The initial seed population from which the genetic process begins can be chosen randomly or on the basis of heuristics, if available for a given application. At each iteration, known as a generation, each individual is evaluated and recombined with others on the basis of its overall quality or fitness. The expected number of times an individual is selected for recombination is proportional to its fitness relative to the rest of the population. Intuitively, the high strength individuals selected for reproduction can be viewed as providers of "building blocks" from which new, higher strength offspring can be constructed.

The inherent power of a genetic algorithm lies in its ability to exploit, in a highly efficient manner, information about a large number of individuals. By allocating more reproductive occurrences to above average individuals, the overall net affect is an upward shift in the population's average fitness. Since the overall average moves upward over time, the genetic algorithm is a "global force" which shifts attention to productive regions (groups of highly fit individuals) in the search space. However, since the population is distributed throughout the search space, genetic algorithms effectively minimize the problem of converging to local maxima.

New individuals are created using two main genetic recombination operators known as crossover and mutation. Crossover operates by selecting a random location in the genetic string of the parents (crossover point) and concatenating the initial segment of one parent with the final segment of the second parent to create a new child. A second child is simultaneously generated using the remaining segments of the two parents. The string segments provided by each parent are the building blocks of the genetic algorithm. Mutation provides for occasional disturbances in the crossover operation by inverting one or more genetic elements during reproduction. This operation insures diversity in the genetic strings over long periods of time and prevents stagnation in the convergence of the optimization technique.

The individuals in the population are typically represented using a binary notation to promote efficiency and application independence in the genetic operations. Other characteristics of the genetic operators remain implementation dependent, such as whether both of the new structures obtained from crossover are retained, whether the parents themselves survive, and which other structures are replaced if the population size is to remain constant. In addition, issues such as the size of the population, crossover rate, mutation rate, generation gap, and selection strategy have been shown to affect the efficiency with which a genetic algorithm operates.

Since genetic algorithms rely on the accumulation of evidence rather than on domain dependent knowledge, they are ideal for optimization in applications where domain theories or other applicable knowledge is difficult or impossible to formulate. A simple statistical approximation to a complex evaluation process can allow genetic systems to effectively adapt in these situations and converge to an approximate global maxima. Genetic algorithms can be used to provide an adaptive behavior within a computer system. The present approach is to allow the genetic system to modify a set of control parameters that affect the output of an existing computer system. By monitoring the quality of the resulting system output, the genetic system can dynamically change the parameters to achieve the best performance.

Figure 4:
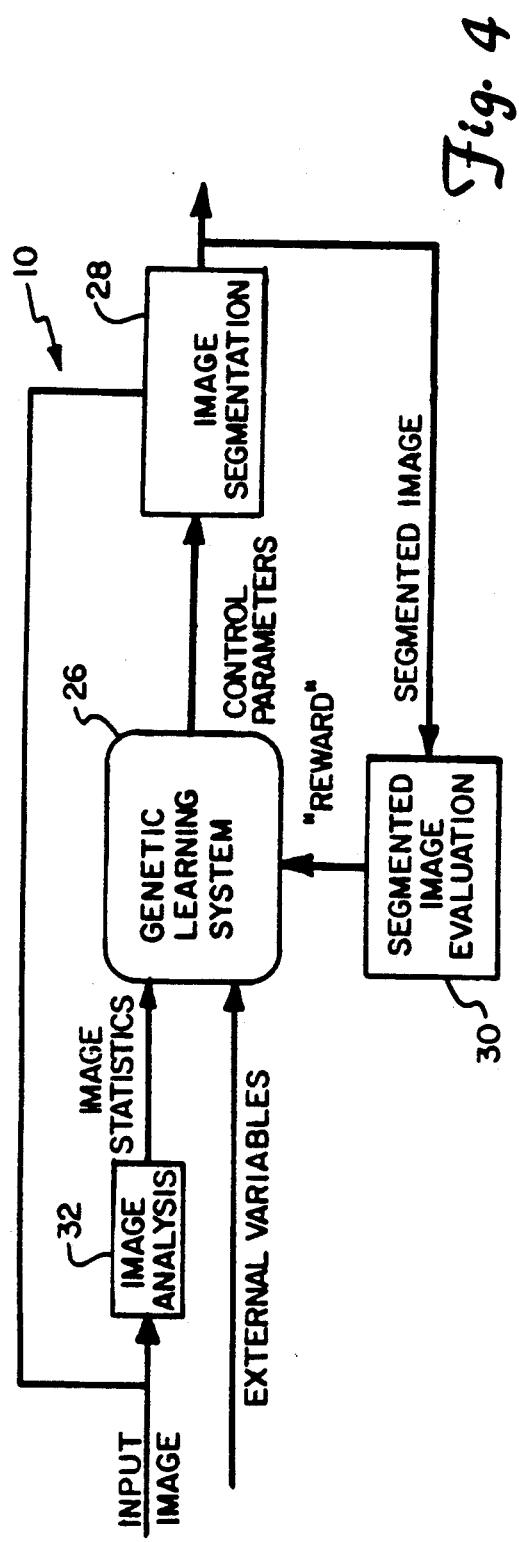
FIG. 4 is a block diagram of the adaptive image segmentation system.

In the present invention, adaptive image segmentation requires the ability to modify control parameters in order to respond to changes that occur in the image as a result of varying environmental conditions. The block diagram of adaptive image segmentation system 10 is shown in FIG. 4. The key features of adaptive image segmentation system 10 include a closed-loop feedback control technique which provides an adaptive capability. The feedback loop consists of genetic learning component 26, image segmentation component 28, and segmented image evaluation component 30. At the input of system 10 is image analysis component 32.

Genetic learning component 26 optimizes segmentation performance on each individual image and accumulates segmentation experience over time to reduce the effort needed to optimize succeeding images.

Image characteristics and external image variables are represented and manipulated using both numeric and symbolic forms within the genetic knowledge structure. Segmentation control parameters are represented and processed using a binary string notation. Image segmentation performance is evaluated using multiple measures of segmentation quality. These quality measures include global characteristics of the entire image as well as local features of individual target regions in the image. The global and local quality measures can be used separately or in combination.

Adaptive segmentation system 10 is very fundamental in nature and is not dependent on any specific segmentation algorithm or sensor data (visible, infrared, laser, etc.).

After acquiring an input image, image analysis component 32 analyzes the image characteristics and passes this information to genetic learning component 26. Using this data, in conjunction with the observed external variables, genetic learning component 26 selects an appropriate parameter combination, which is passed to image segmentation component 28. After the image has been segmented, the results are evaluated by component 30 and an appropriate "reward" is generated and passed back to genetic learning component 26. This process continues on the input images until a segmentation result of acceptable quality is produced.

The input image is analyzed so that a set of features can be extracted to aid in the parameter selection process performed by genetic component 26. A set of characteristics of the image is obtained by computing specific properties of the digital image itself as well as by observing the environmental conditions under which the image was acquired. Each type of information encapsulates knowledge that can be used to determine a set of appropriate starting points for the parameter adaptation process.

Image analysis component 32 produces a set of image statistics that measure various properties of the digital image. Image statistics include, for instance, first order properties which involve measurements of the shape of the first-order image histogram. These measurements include mean, variance, skewness, kurtosis, energy, entropy, and x and y intensity centroids. Also, image statistics include second order properties which are measurements of the histogram features based on joint probability distributions between pairs of pixels. These measurements include autocorrelation, covariance, inertia, co-occurrence matrices, and other derived properties. Histogram peak/valley properties are image statistics that involve the measurements of the values of the peaks and valleys in the image histogram. These measurements include maximum peak height divided by minimum valley height, total number of histogram peaks, maximum peak location, minimum valley location, distance between maximum peak and minimum valley, maximum peak-to-valley ratio, interval set score, and interval set size.

External variables are also used to characterize an input image. These factors specify the conditions under which the image was acquired. These conditions include the time of day, time of year, cloud cover, temperature, humidity, and other environmental factors such as the presence of rain, snow, haze, fog, etc. These conditions affect the quality of the image, which in turn necessitates changes in control parameters.

Figure 5:
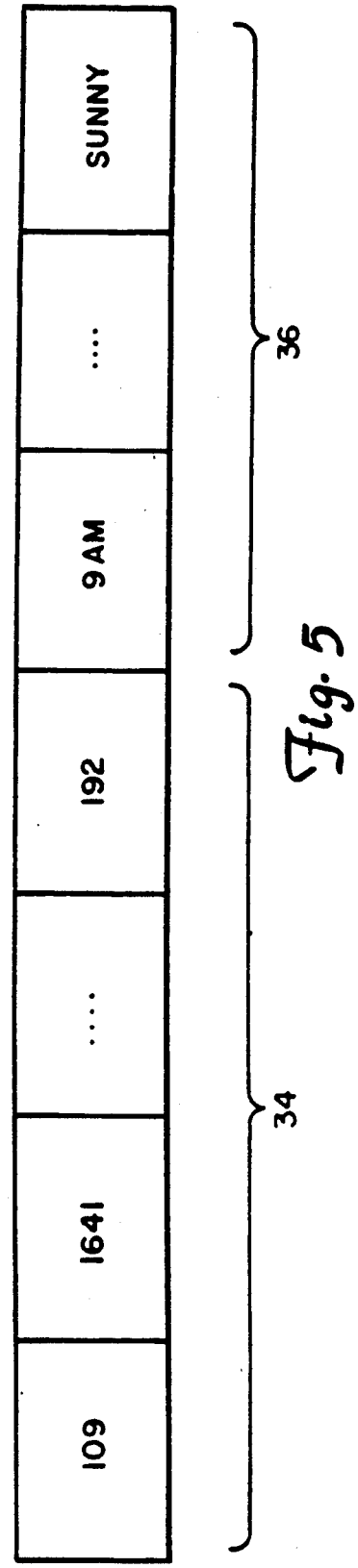

FIG. 5 illustrates the structure of the image statistics 34 and external variables 36 extracted from the image 8 in FIG. 1a. An image characteristics list which includes the statistics and external variables is more complex for color than for monochrome images. For instance, twelve first order properties and histogram properties for each color component (red, green, and blue) of the image include mean, variance, skewness, kurtosis, energy, entropy, x intensity centroid, y intensity centroid, maximum peak height, maximum peak location, interval set score, and interval set size. The last two features measure histogram properties used directly by the Phoenix segmentation algorithm and provide useful image similarity information. Since a gray scale version of the image is used to compute edge information and target contrast during the evaluation process, the twelve features for the Y (luminance component) image are computed as well. Combining the image characteristic data from the four color and luminance components yields a list of 48 elements. In addition, two external variables, time of day and weather conditions, are utilized in the outdoor applications to characterize each image. The external variables are represented symbolically in the list structure (e.g., time=9am, 10am, etc. and weather conditions=sunny, cloudy, hazy, etc.). The distances between these values are computed symbolically when measuring image similarity. The two external variables are added to the list to create an image characteristic list totaling 50 elements for the outdoor experiments.

Figure 6:
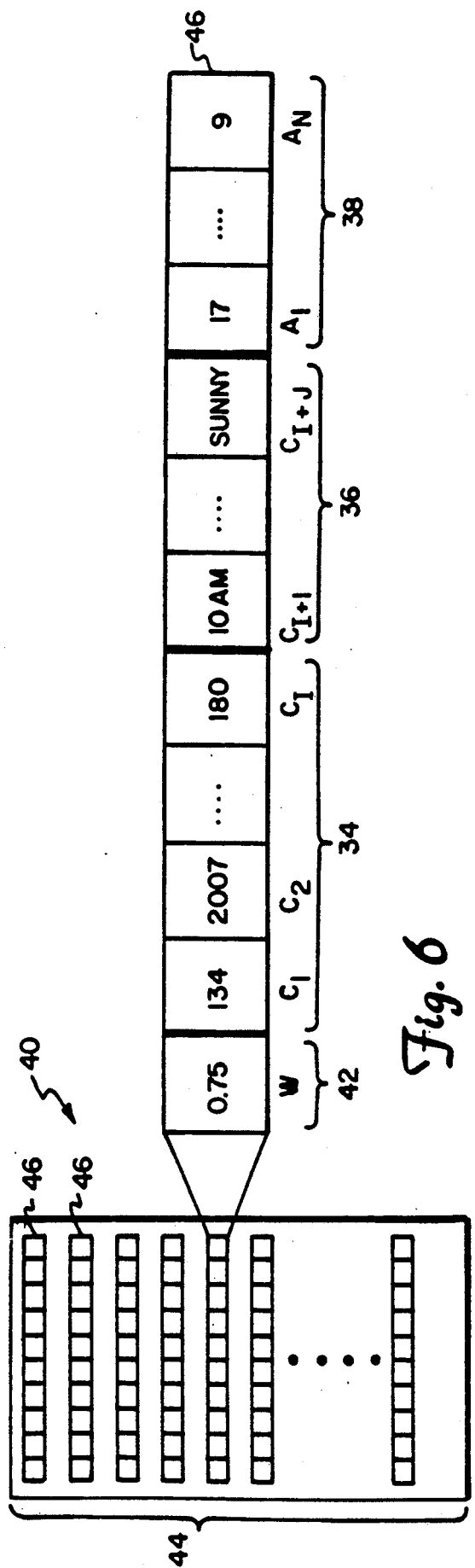
FIG. 6 represents a classifier of the invention.

Once the image statistics 34 and external variables 36 have been obtained, genetic learning component 26 uses this information to select an initial set of segmentation algorithm parameters. A classifier system is used to represent the image characteristics and the associated segmentation parameters. FIG. 6 shows an example of classifier 40 used by genetic learning component 26 (in FIG. 4). Classifier 40 stores the current quality or fitness 42 of parameter settings 38, image statistics 34 and external variables 36 of the image, and segmentation parameter set 38 used to process images having these characteristics. Image statistics 34 and external variables 36 form the condition portion of the classifier 40, $C_1$ through $C_{I+J}$, while segmentation parameters 38 indicate the actions, $A_1$ through $A_N$, of classifier 40. Fitness 42, W, which ranges in value from 0.0 to 1.0, measures the quality of the segmentation parameter set 38. Note that only fitness value 42 and the action portion of classifier 40 are subject to genetic adaptation the conditions remain fixed for the life of classifier 40.

When a new image is provided to genetic learning component 26 (in FIG. 4), the process begins by comparing the image characteristics of the new image (FIG. 5) with classifiers 40 in global population 44 (FIG. 6). Global population 44 represents the accumulated knowledge of the adaptive system obtained through previous segmentation experience. The algorithm computes a ranked list of individuals in population 44 that have characteristics similar to the new image. Ranking is based on the normalized Euclidean distance between the image characteristic values as well as the fitness of classifier 40. The normalized distance between images A and B is computed using $$\text{dist}_{AB} = \sum_{i=1}^{I+J} W_i \left| \frac{C_{iA} - C_{iMIN}}{C_{iMAX} - C_{iMIN}} - \frac{C_{iB} - C_{iMIN}}{C_{iMAX} - C_{iMIN}} \right|$$

where $C_{iMIN}$ is the minimum value of the ith numeric or symbolic feature in global population 44, $C_{iMAX}$ is the maximum value of the ith feature in global population 44, and $W_i$ is the weight attached to the ith feature. The ranges are normalized and the $W_i$ values have been set to 1 so that each feature contributes equally to the distance calculation.

When the distances between an image and several members 46 of global population 44 are the same (e.g., if a previous image contributed multiple individuals 46 to global population 44), fitness values 42 are used to select the best individuals 46 from population 44. Temporary copies of the highest ranked individuals 46 are used to create the initial or seed population for the new image.

Figure 7:
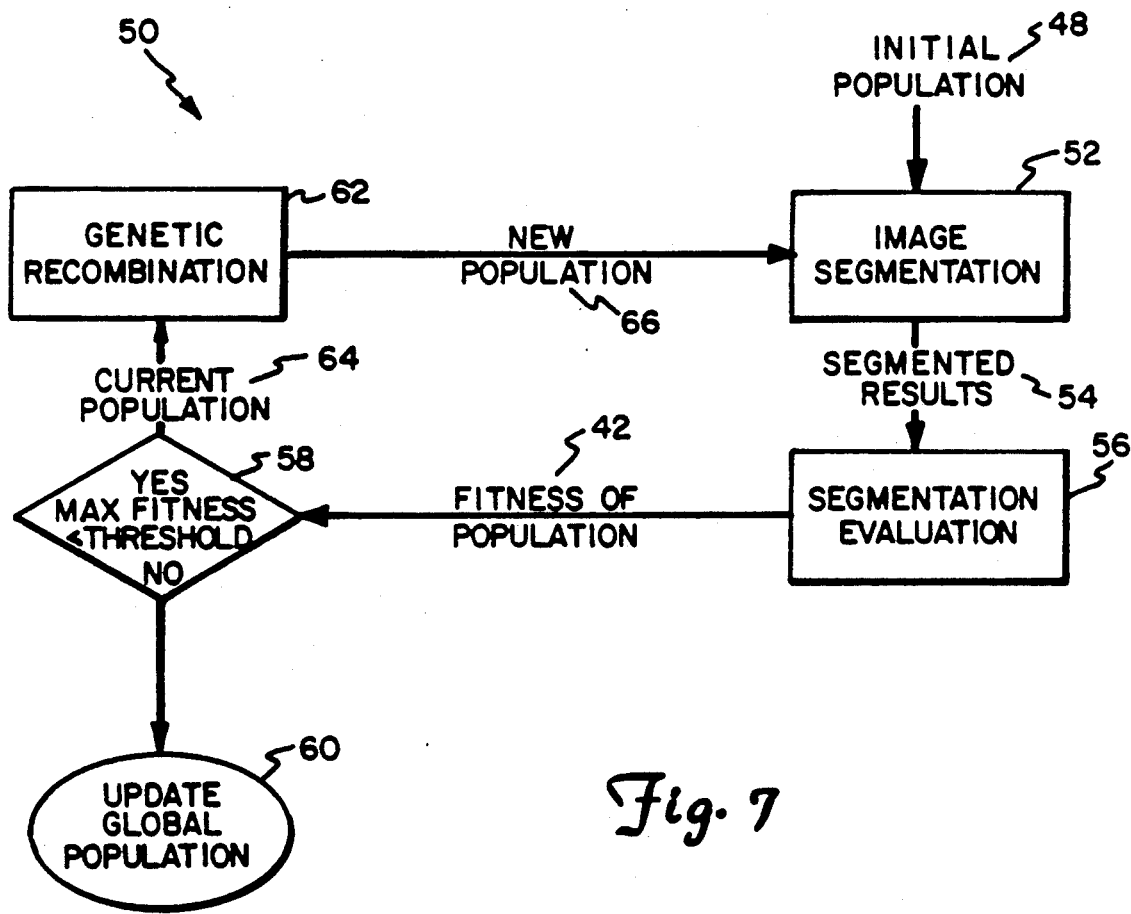
FIG. 7 is a flow chart of a genetic adaption cycle.

Once the seed population is available, genetic adaptation cycle 50 begins. Cycle 50 is shown in FIG. 7. Segmentation parameter set 38 (of FIG. 6) in each member of seed or initial population 48 is used by image segmentation unit 52 to process the image. The quality of segmented results 54 for each parameter set is then evaluated by segmentation evaluation unit 56. If the maximum segmentation quality for the current population 64 is above a predefined threshold 58 of acceptance, the cycle terminates and the high quality members of current image population 64 are used to update 60 global population 44. Less fit members 46 of global population 44 are discarded in favor of higher strength individuals 46 obtained from processing the current image. In this manner, system 50 is able to extend the knowledge of the adaptive segmentation system by incorporating new experience into classifier 40 database.

Alternatively, if after segmenting and evaluating the performance of current population 64, system 50 has not achieved acceptable segmentation quality, genetic recombination operators 62 are applied to the members of current population 64. Crossover and mutation operators 62 are applied to the high strength individuals 44 in population 64, creating a new set of offspring which will theoretically yield better performance. New population 66 is supplied back to image segmentation process unit 52, where the cycle begins again. Each pass through the loop (segmentation, evaluation and recombination) is known as a generation. Cycle 50, shown in FIG. 7, continues until the maximum fitness achieved at the end of a generation exceeds some threshold, as described earlier. Global population 44 is modified in order to retain the information "learned" during the genetic process. Global population 4 is updated and system 10 is then ready to process a new image.

Figure 8:
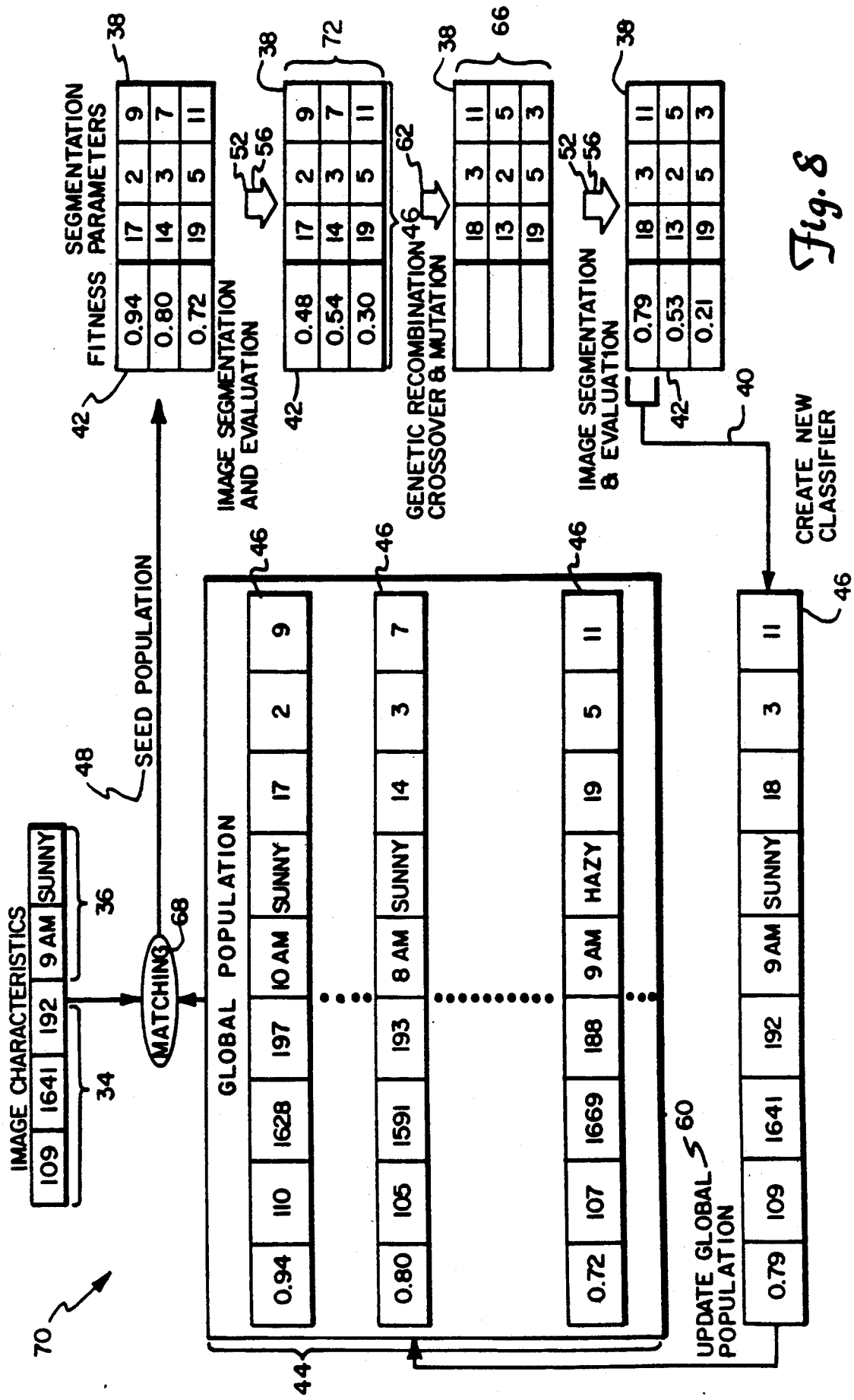
FIG. 8 illustrates a cycle through the adaptive image segmentation system.

FIG. 8 provides an example of adaptive segmentation system 10 (in FIG. 4). Image characteristics 34 and 36 (of FIG. 6) extracted from image 8 in FIG. 1a are used in this example as the new image data. A subset of the complete image characteristics is used here for the sake of simplicity. The new image characteristics are compared with individuals 46 in global population 44 to obtain initial seed population 48. The normalized Euclidean distance is computed from the new image to every member 48 of global population 44 and this distance is used in conjunction with fitness 42 of each individual 46 in population 44. In this example, seed population 48 is limited to 3 individuals. In actual situations, seed population 48 for each image consists of 10 classifiers while global population 44 holds 100 classifiers in order to maintain a diverse collection of segmentation experience. Matching process 68 identifies three members 46 of global population 44 with similar image characteristics and a high degree of fitness. A copy of these individuals 46 is then extracted to create seed population 48 shown in FIG. 8.

Figure 9:
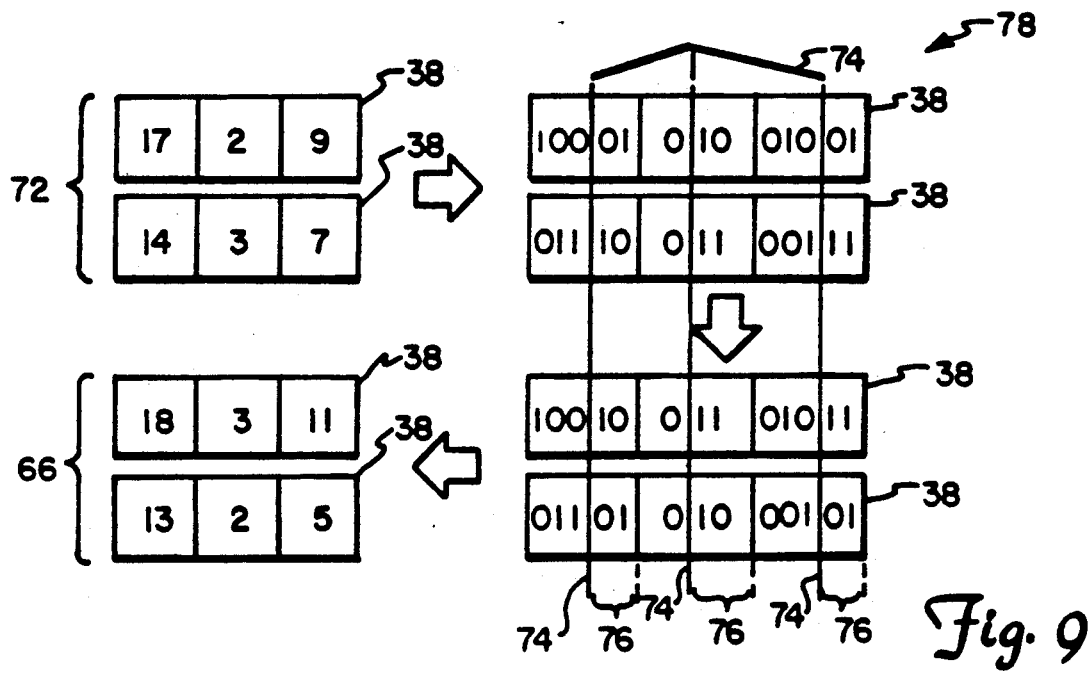
FIG. 9 reveals a crossover operation of the segmentation system.
Figure 10:
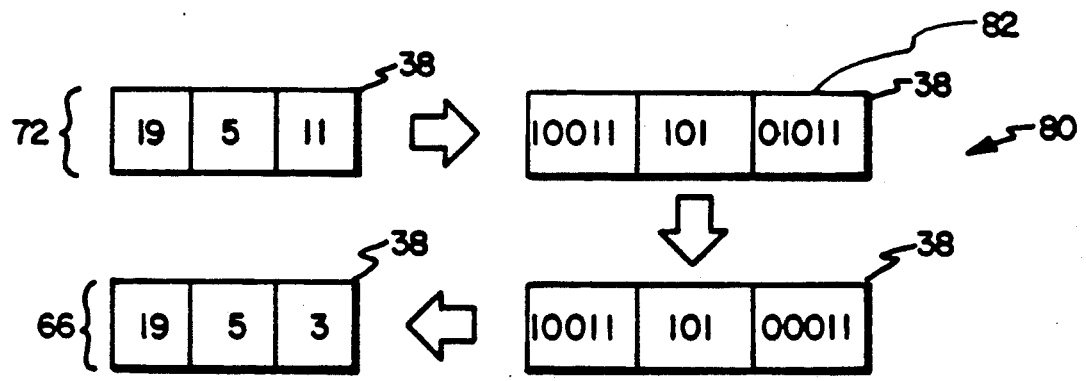
FIG. 10 reveals a mutation operation of the segmentation system.

After seed population 48 is obtained, fitness 42 of each individual 46 is established by processing the new image with associated segmentation parameters 38. Thus, image segmentation and evaluation steps 52 and 56, shown in FIG. 7, are performed to derive new fitness values 42 shown in population 72 of FIG. 8. Assuming a threshold fitness value of 0.70, none of the fitness values obtained from the initial population (0.48, 0.54, and 0.30) is acceptable. Current population 64 is now passed through genetic recombination step 62 in FIG. 7 to generate a set of new individuals 46 for new population 66. In this example, the first two members 46 of current population 64 are combined using the crossover operator while third member 46 is modified using the mutation operator. FIG. 9 illustrates a crossover operation 78. There is a conversion of segmentation parameters 38 of population 72 from decimal to binary representation, the crossover point 74 in each segmentation parameter 38 is randomly selected and second halves 76 of the binary strings are exchanged. The resulting strings are converted to a decimal format of population 66 to complete crossover operation 78. Similarly, FIG. 10 provides the details of mutation operator 80. The decimal values of parameters 38 of population 72 are converted from decimal to binary representations. One of the bit locations of the binary representation is selected as a mutation bit 82. Chosen mutation bit 82 is inverted and then parameters 38 are converted to decimal format of population 66 to complete mutation operation 80.

In FIGS. 7 and 8, newly created population 66 must be passed through the segmentation and evaluation stages 52 and 56 once more to determine fitness 42 of each individual 46. Fitness values 42 of new population 66 are shown in FIG. 8. Since fitness 42 of the first individual 46 (0.79) exceeds the threshold value 58 (0.70), adaptive cycle 50 for this image is terminated. A new classifier 40 is created for the current image by inserting the appropriate image characteristics 34 and 36 and storing new parameter settings 38 and their associated fitnesses 42. This classifier 40 is then inserted into global population 44, replacing the least fit member 46. Had any other members 46 of the new image's population 66 been greater than threshold 58, they too would have been placed into the global population 44.

Since color imagery is utilized with the present description, the Phoenix segmentation algorithm is selected. The present system, with the Phoenix algorithm, employs a region-splitting technique that uses information from the histograms of the red, green, and blue image components simultaneously. The algorithm recursively splits regions in the image into smaller subregions on the basis of a peak/valley analysis of the various color histograms. Fourteen different parameters are used to control the thresholds and termination conditions used within the algorithm. Of these fourteen values, two are selected as the most critical parameters that affect the overall results of the segmentation process, maxmin and hsmooth. Maxmin specifies the lowest acceptable peak-to-valley-height ratio used when deciding whether or not to split a large region into two or more smaller parts. Hsmooth controls the width of the window used to smooth the histogram of each image region during segmentation. Smoothing helps to remove small histogram peaks corresponding to small irrelevant regions or noise in the image. The number of selected parameters used may be increased for adaptation in order to investigate more difficult segmentation tasks.

However, incorrect values in the two main parameters of the Phoenix algorithm lead to results in which, at one extreme, the desired object is not extracted from the background, and at the other extreme the object is broken up into many small regions that are of little use to higher level processes. By measuring segmentation performance using appropriate segmentation quality criteria, the genetic process attempts to identify a parameter set that yields results between these two extremes.

Figure 11A:
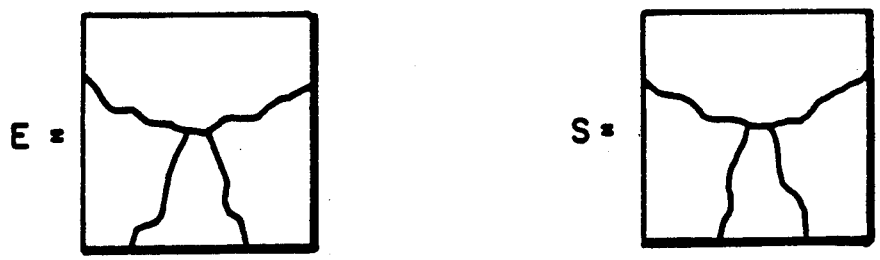
FIGS. 11a-11c are diagrams for quality measures for edge-border and boundary consistency, pixel classification and object overlap, and object contrast.

After the image segmentation process has been completed by the Phoenix algorithm, the overall quality of the segmented image is measured. There are a large number of segmentation quality measures that have been suggested, although none have achieved widespread acceptance as a universal measure of segmentation quality. In order to overcome the drawbacks of using only a single quality measure, an evaluation technique has been incorporated that uses five different quality measures to determine the overall fitness for a particular parameter set. The selected measures of segmentation quality include edge-border coincidence, boundary consistency, pixel classification, object overlap and object contrast. Edge-border coincidence measures the overlap of the region borders in the image acquired from the segmentation algorithm relative to the edges found using an edge operator. In this quality measure, the Sobel operator is used to compute the necessary edge information. The original, unthinned Sobel edge image is used to maximize overlap between the segmented image and the edge image. Edge-border coincidence (see FIG. 11a) is defined by letting E be the set of pixels extracted by the edge operator after thresholding and S be the set of pixels found on the region boundaries obtained from the segmentation algorithm. E and S are determined by the following equations.

$$E = \{p1, p2, \ldots, pE\} = \{(x_{p1}, y_{p1}), (x_{p2}, y_{p2}), \ldots, (x_{pE}, y_{pE})\} \text{ and}$$

$$S = \{q1, q2, \ldots, qs\} = \{(x_{q1}, y_{q1}), (x_{q2}, y_{q2}), \ldots, (x_{qs}, y_{qs})\}.$$

Edge-border coincidence is computed with following equation.

$$\text{Edge-border Coincidence} = \frac{n(E \cap S)}{n(E)}$$

where n(A)=the number of elements in set A and $E \cap S = \{(x_k, y_k), k=1, \ldots, m \text{ where } (x_k, y_k) \in E \text{ and } S\}$ Boundary consistency is similar to edge-border coincidence, except that region borders which do not exactly overlap edges can be matched with each other. In addition, region borders which do not match with any edges are used to penalize the segmentation quality. The Roberts edge operator is used to obtain the required edge information. As with the edge-border coincidence measure, the Roberts edge image is not thinned to maximize the overlap between images. Boundary consistency is computed in the following manner (see FIG. 11a). The first step is to find compatible pixel pairs in the region boundary and edge results. Each pixel in the segmented image region boundary results, S, is compared with neighboring pixels in the edge image, E. A "reward" for matching the ith pixel is computed with the following equation, $R_i = W_1 * (d_{max} - d_i)$, where $W_1 = 0.1$, $d_{max} = 10$, and $d_i = $ the distance to the nearest pixel.

Thus, if the pixels overlap, $R_i = 0.1 * (10-0) = 1$. Pixels that do not directly overlap contribute a reward value that is inversely proportional to their distance from each other. As matching pairs of pixels are identified, they are removed from the region boundary and edge images (S and E). The total reward for all matching pixel pairs is obtained below.

$$R_{TOTAL} = \sum_i W_1 * (d_{max} - d_i)$$

Once all compatible pixel pairs have been removed from E and S, the remaining pixels correspond to the difference between the two images. These pixels are used to compute a penalty as indicated here.

$P = W_2 * \Sigma$ all remaining pixels in $E$ and $S$, where $W_2 = 0.5$.

Finally, since the value of boundary consistency must be positive, an intermediate value, M, is defined by the following equation $$M = \frac{R_{TOTAL} - P}{n(E)}.$$

Then, boundary consistency is computed using M.

Boundary Consistency $= M$, if $M \geq 0$
$= 0$, if $M < 0$

Figure 11B:

Pixel classification is based on the number of object pixels classified as background pixels and the number of background pixels classified as object pixels. A is designated as the set of object pixels in the groundtruth image and B as the set of object pixels in the segmented image (see FIG. 11b) in the following equations.

$A = \{p1, p2, \ldots, pA\} = \{(x_{p1}, y_{p1}), (x_{p2}, y_{p2}), \ldots, (x_{pA}, y_{pA})\}$ and $B = \{q1, q2, \ldots, qB\} = \{(x_{q1}, y_{q1}), (x_{q2}, y_{q2}), \ldots, (x_{qB}, y_{qB})\}$.

Figure 11C:

Since pixel classification must be positive, the intermediate value N is defined by the following expression.

$$N = 1 - \left[ \frac{(n(A) - n(A \cap B)) + (n(B) - n(A \cap B))}{n(A)} \right]$$

where $A \cap B = \{(x_k, y_k), k = 1, \ldots, m \text{ where } (x_k, y_k) \in A \text{ and } B\}$ Pixel classification is computed using N Pixel Classification $= N$, if $N \geq 0$
$= 0$, if $N < 0$ Object overlap measures the area of intersection between the object region in the ground truth image and the segmented image, divided by the object region. As defined in the pixel classification quality measure, A is the set of object pixels in the groundtruth image and B is the set of object pixels in the segmented image (note FIG. 11b). Object overlap can be computed as $$\text{Object Overlap} = \frac{n(A \cap B)}{n(A)}.$$

where $A \cap B = \{(x_k, y_k), k = 1, \ldots, m \text{ where } (x_k, y_k) \in A \text{ and } B\}$ Object contrast measures the contrast between the object and the background in the segmented image, relative to the object contrast in the ground truth image. A is the set of object pixels in the groundtruth image and B is the set of object pixels in the segmented image, as shown in FIG. 11c and defined in the pixel classification quality measure. In addition, a bounding box (X and Y) is defined for each object region in these images. These boxes are obtained by enlarging the size of the minimum bounding rectangle for each object (A and B) by 10 pixels on each side. The pixels in regions X and Y include all pixels inside these enlarged boxes with the exception of the pixels inside the A and B object regions. The average intensity is computed for each of the four regions (A, B, X, and Y) using $$I_R = \frac{\sum_{j=1}^{R_{max}} I(j)}{R_{max}}.$$

where I(j) is the intensity of the jth pixel in some region R and $R_{max}$ is the total number of pixels in region R. The contrast of the object in the groundtruth image, $C_{GT}$, and the contrast of the object in the segmented image, $C_{SI}$, can be computed by using $$C_{GT} = \left| \frac{I_A - I_X}{I_A} \right|, \quad C_{SI} = \left| \frac{I_B - I_Y}{I_B} \right|.$$

The object contrast quality measure is then computed by the following equations.

$$\text{Object Contrast} = \frac{C_{SI}}{C_{GT}}, \text{ if } C_{GT} \geq C_{SI}$$

$$= \frac{C_{GT}}{C_{SI}}, \text{ if } C_{GT} < C_{SI}.$$

The maximum and minimum values for each of the five segmentation quality measures are 1.0 and 0.0, respectively. The first two quality measures are global measures since they evaluate the segmentation quality of the whole image with respect to edge information. Conversely, the last three quality measures are local measures since they only evaluate the segmentation quality for the object regions of interest in the image. When an object is broken up into smaller parts during the segmentation process, only the largest region which overlaps the actual object in the image is used in computing the local quality measures.

The three local measures require the availability of object ground truth information in order to correctly evaluate segmentation quality. Since object groundtruth data may not always be available, we have designed the adaptive segmentation system to use three separate methods of evaluating segmentation quality. First, quality can be measured by using global evaluation methods alone. Second, if groundtruth data is available and there is only interest in correctly segmenting the object regions in the image, local evaluation methods can be used alone. Finally, if good object regions are desired as well as high quality overall segmentation results, global and local quality measures can be combined to obtain a segmentation quality measure that maximizes overall performance of the system.

The five quality measures can actually be combined into a single, scalar measure of segmentation quality using a weighted sum approach. Each of the five measures is given equal weighting in the weighted sum. In addition to the weighted sum technique currently in use, a more complex vector evaluation approach may be used to provide multidimensional feedback on segmentation quality.

Figure 12:
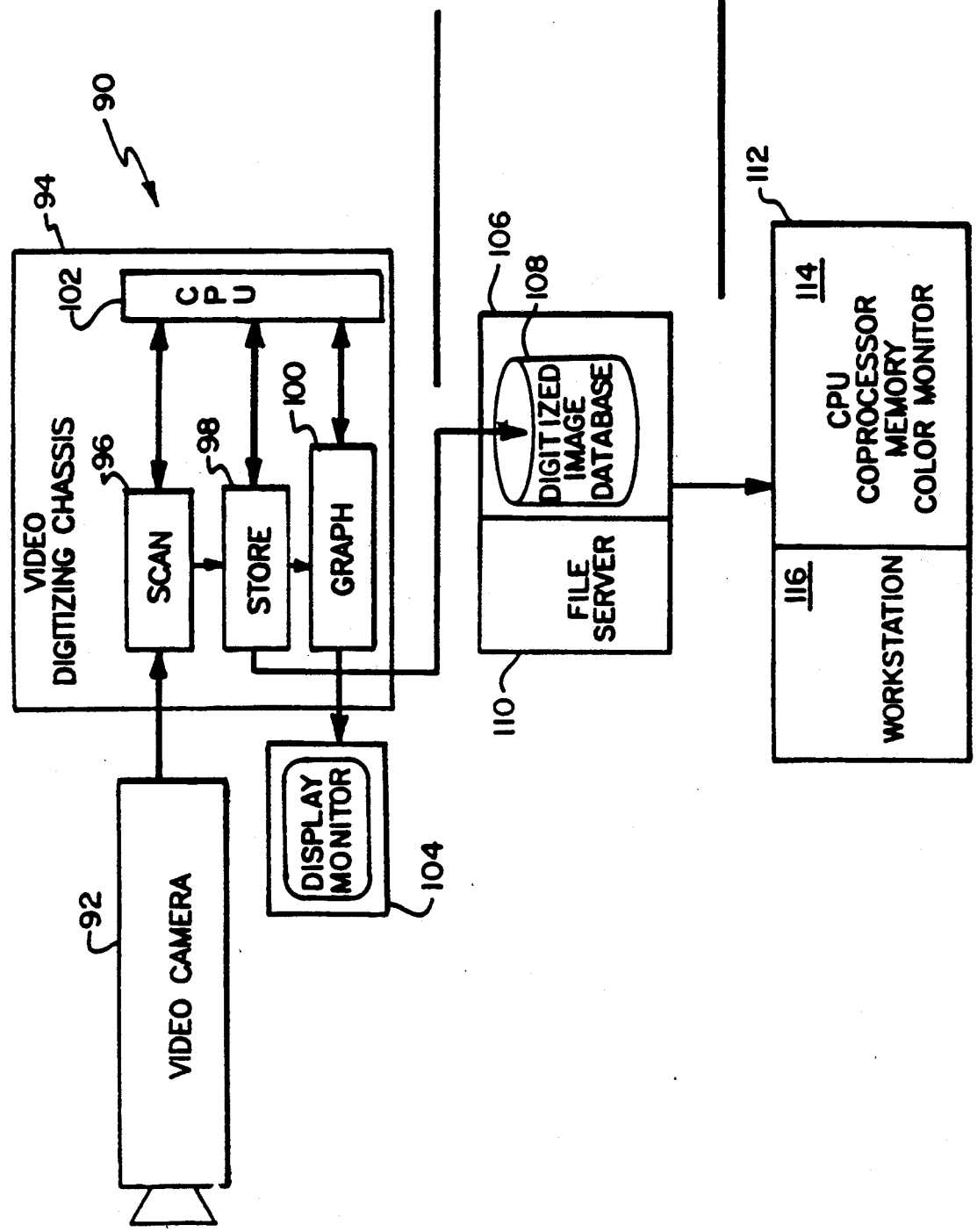
FIG. 12 shows an implementation of the adaptive segmentation system.

FIG. 12 reveals implementation 90 of the present invention. Images are picked up by sensor 92 which is a JVC GX-S700U video camera having a 10.5 to 105 millimeter (mm) zoom lens. Sensor 92 is connected to digitizing hardware 94 which is a Data Cube Max video digitizing chassis. Hardware 94 has device 96 connected to sensor 92. Device 96 is a Max Scan 089-0250. Device 98, an ROI Store 010-0273, is connected to device 96. Device 100, a Max Graph 080-0225-02, is connected to 98 and to display monitor 104. Device 102, a 68020 central processing unit (CPU), is connected to devices 96, 98 and 100. Digitized image database 108 of image file storage unit 106 is connected to device 98 of digitizing hardware 94. Sun 3/280 file server 110 works in conjunction with database 108. Storage 106 is connected to adaptive segmentation work station 112. Work station 112 has Sun 3/60 work station and processing unit 114. Unit 114 has a 68020 CPU, a 68881 coprocessor, a 16 megabyte memory and a color monitor. Unit operates with 4.2 BSD Unix. Devices 94, 106 and 112 are interconnected using Ethernet.

Adaptive Image Segmentation System

Image Analysis

```
/*
**
*/ include <stdio.h>
include <strings.h>
#include "histo.h"
#include "interval.h"

int   HSMOOTH  = 9,
      I_MAXMIN = 160,
      I_HEIGHT = 20,
      I_RELAREA = 2,
      I_ABSAREA = 10,
      I_ABSMIN = 10;

main(argc, argv)
     int   argc;
     char  *argv[];
{
  char   featurelist[MAXFEAT][H_STRING];
  char   robertsfile[H_STRING], sobelfile[H_STRING];
  int    i, numfeat, robedges, sobedges;
  HISTOGRAM **hist, *smoothed;
  INTSET **intset;
```

```c
/* Make sure arguments are supplied. */
if (argc < 7 || strcmp(argv[1], "-help") == 0) {
  printf("Usage: imagestat red green blue bw roberts_edge sobel_edge
    -hs (9) -mm (160)\n"exit();
}.

strcpy(featurelist[0], argv[1]);
strcpy(featurelist[1], argv[2]);
strcpy(featurelist[2], argv[3]);
strcpy(featurelist[3], argv[4]);
strcpy(robertsfile, argv[5]);
strcpy(sobelfile, argv[6]);

i = 6;
while (++i < argc) {
  if (strcmp(argv[i], "-hs") == 0)
    HSMOOTH = atoi(argv[++i]);
  else if (strcmp(argv[i], "-mm") == 0)
    I_MAXMIN = atoi(argv[++i]);
  else {
    fprintf(stderr, "histogram: unknown parameter %s.\n", argv[i]);
    exit();
  }
} numfeat = MAXFEAT;

/* Allocate the arrays. */
hist = (HISTOGRAM **) malloc(numfeat * sizeof(HISTOGRAM *));
intset = (INTSET **) malloc(numfeat * sizeof(INTSET *));

/*
 * dohistogram -- execute histogram phase of segmentation
 */ for (i = 0; i < numfeat; i++) {
  hist[i] = Hmake (featurelist[i]);
  if (HSMOOTH > 1) {
    smoothed = Hsmooth (hist[i], HSMOOTH);
    free(hist[i]);
    hist[i] = smoothed;
  }
}

/*
 ** dointerval -- execute interval phase of segmentation.
 */ for (i = 0; i < numfeat; i++) {
  intset[i] = Imake (hist[i]);

if (intset[i] == NULL) {
    printf("Error: Imake failed on feature %s.\n",featurelist[i]);
  }
}

/*
 ** Count edge pixels in roberts and sobel edge images.
 */
edgecount(robertsfile, sobelfile, &robedges, &sobedges);

/*
 ** Describe the image characteristics.
 */
strcpy(featurelist[0], "R:");
```

```c
  strcpy(featurelist[1], "G:");
  strcpy(featurelist[2], "B:");
  strcpy(featurelist[3], "Y:");

for (i = 0; i < numfeat; i++)
    printf("%s %f %f %f %f %f %f\n     %f %f    %d %d %d\n", featurelist[i],
           hist[i]->H_mean, hist[i]->H_sigma, hist[i]->H_skewness,
           hist[i]->H_kurtosis, hist[i]->H_energy, hist[i]->H_entropy,
           hist[i]->H_xcent, hist[i]->H_ycent,
           hist[i]->H_apex, hist[i]->H_apexloc,
           intset[i]->IS_score, intset[i]->IS_size);

printf("Roberts_edge_pixels: %d   Sobel_edge_pixels: %d\n",
         robedges, sobedges);
}
/*
**   histo.h
**
**      Declarations for histogram data structures.
**
*/ define MAX(x,y)  ((x)>(y) ? (x) : (y))
define MIN(x,y)  ((x)<(y) ? (x) : (y))

define MAXFEAT 4 define H_STRING 150                    /* length of names in file header */

/* Size of histogram array. */
#define H_SIZE(h) (((h)->H_width) * sizeof (H_ELEM))

/* Histogram bucket data type. */
typedef int H_ELEM;

/* Histogram structure. */
typedef struct {
   char   H_file[H_STRING];    /* Source image file name       */
   int    H_width;             /* # of buckets                 */
   int    H_min;               /* Min non-zero bucket          */
   int    H_max;               /* Max non-zero bucket          */
   int    H_xlen;              /* Display height               */
   int    H_ylen;              /* Display width                */
   float  H_mean;
   float  H_sigma;
   float  H_skewness;
   float  H_kurtosis;
   float  H_energy;
   float  H_entropy;
   float  H_xcent;
   float  H_ycent;
   H_ELEM H_apex;              /* Largest bucket value         */
   H_ELEM H_apexloc;           /* Largest bucket value location*/
   H_ELEM H_val[1];            /* Array of buckets             */
} HISTOGRAM;

HISTOGRAM *Hmake();
HISTOGRAM *Hsmooth();
/*
**   HISTOGRAM *Hmake(filename)
**
**      Hmake will make a histogram of the open image file, and
**      will return a pointer to the resulting histogram. Feat, the
**      name of the image feature being histogrammed, will be copied
**      into the histogram structure, but is not otherwise interpreted.
**
*/
```

```c
#include <stdio.h>
#include <sys/types.h>
#include "/src/sip/include/sig/sigdef.h"
#include "histo.h"

/* External routines. */
char *malloc();

HISTOGRAM *Hmake(filename)
    char    *filename;
{
  HISTOGRAM *h;             /* result buffer */
  int   fdin, ncols, nrows, width, i, j;
  float m00, m10, m01;
  u_char *sigbuf, *tmpbuf;

mode = 1;
  sigopen(&fdin, filename, &ncomps, ndims, dimszs, pixszs, signs,
          &mode, &status);
  if (status) {
    printf("Hmake: cannot open %s.\n", filename);
    exit();
  } ncols = dimszs[0][0];
  nrows = dimszs[0][1];

sigbuf = (u_char *) malloc(ncols * nrows * sizeof(char));
  begend[0][0] = begend[1][0] = 0;
  begend[0][1] = ncols - 1;
  begend[1][1] = nrows - 1;
  usrszs[0] = ncols;
  usrszs[1] = nrows;
  usrbits = pixszs[0];
  sigread(&fdin, &comp, begend, sigbuf, usrszs, &usrbits, &status);
  sigclose(&fdin, &status);

/* Determine required # of histogram buckets. */
  width = 1 << pixszs[0];

/* Allocate the histogram structure. */
  h = (HISTOGRAM *) malloc(sizeof(HISTOGRAM) + (width*sizeof(H_ELEM)));
  if (h == NULL) {
    printf("Unable to allocate histogram.");
    return(NULL);
  }

/* Zero the histogram vector. */
  for (i = 0; i < width; i++)  h->H_val[i] = 0;

/* Copy the histogram discriptors. */
  strcpy(h->H_file, filename);
  h->H_width = width;
  h->H_xlen = ncols;
  h->H_ylen = nrows;

/* Accumulate the histogram. */
  tmpbuf = sigbuf;
  m00 = m10 = m01 = 0.0;
  for (i = 0; i < nrows; i++)
    for (j = 0; j < ncols; j++, tmpbuf++) {
      m00 += *tmpbuf;
      m01 += j * *tmpbuf;
      m10 += i * *tmpbuf;
```

```
        h->H_val[*tmpbuf] ++;
      } h->H_xcent = m01 / m00;
  h->H_ycent = m10 / m00;
  h->H_mean = m00 / (ncols * nrows);

/* Release working storage. */
  free(sigbuf);

/* Compute the histogram statistics. */
  Hstats(h, 0);

/* Return the histogram structure. */
  return(h);
}
edgecount(robertsfile, sobelfile, robedges, sobedges)
     char *robertsfile, *sobelfile;
     int *robedges, *sobedges;
{
  register int i;
  int fdin, ncols, nrows;
  u_char *robbuf, *sobbuf, *robtmp, *sobtmp;

/* Open roberts edge image and read it. */
  mode = 1;
  sigopen(&fdin, robertsfile, &ncomps, ndims, dimszs, pixszs, signs,
          &mode, &status);
  if (status) {
    printf("edgecount: cannot open %s.\n", robertsfile);
    exit();
  }
  ncols = dimszs[0][0];
  nrows = dimszs[0][1];

robbuf = (u_char *) malloc(ncols * nrows * sizeof(char));
  begend[0][0] = begend[1][0] = 0;
  begend[0][1] = ncols - 1;
  begend[1][1] = nrows - 1;
  usrszs[0] = ncols;
  usrszs[1] = nrows;
  usrbits = pixszs[0];
  sigread(&fdin, &comp, begend, robbuf, usrszs, &usrbits, &status);
  sigclose(&fdin, &status);

/* Open sobel edge image and read it. */
  sigopen(&fdin, sobelfile, &ncomps, ndims, dimszs, pixszs, signs,
          &mode, &status);
  if (status) {
    printf("edgecount: cannot open %s.\n", sobelfile);
    exit();
  }
  sobbuf = (u_char *) malloc(ncols * nrows * sizeof(char));
  sigread(&fdin, &comp, begend, sobbuf, usrszs, &usrbits, &status);
  sigclose(&fdin, &status);

*robedges = *sobedges = 0;
  robtmp = robbuf;
  sobtmp = sobbuf;
  for (i = 0; i < ncols*nrows; i++, robtmp++, sobtmp++) {
    if (*robtmp != 0)  (*robedges)++;
    if (*sobtmp != 0)  (*sobedges)++;
  }
  free(robbuf);
  free(sobbuf);
}
```

```
/* Hsmooth -- smooth histogram
 *
 * #include <histo.h>
 * HISTOGRAM *Hsmooth (hist,width);
 * HISTOGRAM *hist;
 * int width;
 *
 * Hsmooth creates a new histogram by taking an existing one and
 * smoothing it.  The smoothing function takes a linear, unweighted
 * average over a local window of the histogram buckets; the only
 * parameter is the width of the window.  A width of 1 is equivalent
 * to no modification of the original values.
 *
 */ include "histo.h"

char *malloc ();

HISTOGRAM *Hsmooth (in,width)
HISTOGRAM *in;
int width;
{
  HISTOGRAM *out;                          /* output histogram */
  register int left,right,middle;          /* bucket numbers */
  register H_ELEM sum;                     /* running sum */
  register H_ELEM leftend,rightend;        /* extremal bucket values */
  int bighalf,smallhalf;                   /* halves of width */ out = (HISTOGRAM *) malloc (sizeof(HISTOGRAM) + H_SIZE(in));
  if (out == 0)  return (0);

(*out) = (*in);                          /* copy header fields */ smallhalf = width / 2;                   /* find halves */
  bighalf = width - smallhalf;

leftend = in->H_val[0];                  /* find extreme values */
  rightend = in->H_val[in->H_width-1];

sum = leftend * bighalf;                 /* calcluate out[-1] to start */
  for (right=0; right<smallhalf; right++) {
    sum += in->H_val[right];
  } middle = 0;                              /* set up for out[0] */
  left = -bighalf;
  right = smallhalf;

while (middle < in->H_width) {           /* for each output value */
    sum -= ((left > 0) ? (in->H_val[left]) : leftend);
    sum += ((right < in->H_width) ? (in->H_val[right]) : rightend);
    left++;
    right++;
    out->H_val[middle++] = (sum + smallhalf) / width;
  }

Hstats(out, 2);   /* Compute the apex height and the apex location. */ return (out);
}
/* Hstats -- compute derived values for histogram
 *
 * #include <histo.h>
 * Hstats (hist);
 * HISTOGRAM *hist;
```

```c
#include <math.h>
#include "histo.h"

Hstats (h, option)
    HISTOGRAM *h;
    int   option;
{
  int   i, lo, hi;
  float prob, mean, variance, skewness, kurtosis, energy, entropy;
  H_ELEM apex, apexloc;

/* find lowest and highest non-zero buckets */
  for (lo=0; lo<h->H_width && h->H_val[lo]==0; lo++) ;
  for (hi=h->H_width-1; hi>=0 && h->H_val[hi]==0; --hi) ;
  if (lo > hi)  hi = lo = 0;

if (option == 0 || option == 1) {
    mean = h->H_mean;
    variance = skewness = kurtosis = energy = entropy = 0.0;
    for (i = lo; i <= hi; i++) {
      prob = (float) h->H_val[i] / (h->H_xlen * h->H_ylen);
      variance += (i-mean) * (i-mean) * prob;
      skewness += (i-mean) * (i-mean) * (i-mean) * prob;
      kurtosis += (i-mean) * (i-mean) * (i-mean) * (i-mean) * prob;
      energy += prob * prob;
      if (prob > 0.0)  entropy += prob * log(prob)/log(2.0);
    }
    h->H_sigma = sqrt(variance);
    h->H_skewness = skewness / (variance * h->H_sigma);
    h->H_kurtosis = kurtosis / (variance * variance);
    h->H_energy = energy;
    h->H_entropy = entropy;
    h->H_min = lo;
    h->H_max = hi;
  } if (option == 0 || option == 2) {
    apex = apexloc = 0;
    for (i = lo; i <= hi; i++)
      if (h->H_val[i] > apex)  { apex = h->H_val[i]; apexloc = i; } h->H_apex = apex;
    h->H_apexloc = apexloc;
    h->H_min = lo;
    h->H_max = hi;
  }
}
/*****************************************45*********************
 * Imake -- generate an interval set for a histogram
 *
 * This routine creates an interval set from a histogram.  This is a three-
 * step process: (1) each relative maximum of the histogram is selected as
 * a potential interval; (2) several tests are applied to the potential
 * intervals and those which fail any test are merged with an adjacent
 * interval; (3) if too many intervals remain discard some--those discarded
 * will be those separated from their neighbors by the highest valleys of
 * the histogram.
 *
 ****************************************************************/ include <stdio.h>
include "histo.h"
#include "interval.h"
```

```c
/* External parameters controlling interval set creation. */
extern int I_MAXMIN;            /* max max-min ratio         */
extern int I_HEIGHT;            /* % of 2nd highest apex     */
extern int I_RELAREA;           /* % of total hist area      */
extern int I_ABSAREA;           /* min interval area         */
extern int I_ABSMIN;            /* multiple for lowest edge  */

/* Forward declaration. */
static INTSET *makeintset();

/* Datatype definitions. */
typedef int INTNO;
typedef int PIXEL;
typedef int AREA;
typedef int INTEGER;

typedef struct {
   INTNO I_next, I_prev;        /* double circular links */
   PIXEL I_left, I_right;       /* interval range */
   AREA I_lside, I_rside;       /* height of the sides */
   AREA I_apex;                 /* highest point */
   AREA I_area;                 /* area of interval */
   INTEGER I_maxmin;            /* max-min ratio */
} INREC;                        /* interval record */

/* Global declarations. */
static int nin;                 /* number of intervals */
static INREC *inr;              /* INREC list */
static AREA apex;               /* highest point in hist */

INTSET *Imake (hist)
   HISTOGRAM *hist;
{
   INTSET *intset;
   char *malloc();

/* Allocate the array of local interval records. */
   inr = 0;
   inr = (INREC *) malloc ((hist->H_width) * sizeof(INREC));
   if (inr == 0) {
      fprintf (stderr,"Imake: Failed to allocate storage for");
      fprintf (stderr," interval records\n");
      return (0);
   }
   /* Set up initial intervals in inr. */
   setupi(hist);

/*
   ** Heuristics -- yuk!
   */

/*
   ** Highest point must be at least some constant times its lowest point.
   */
   if (nin >= 2)   domaxmin(I_MAXMIN);

/*
   ** Interval area must exceed some constant and some fraction of the total
   ** area of the region being segmented.
   */
   if (nin >= 2)   doarea(I_ABSAREA,I_RELAREA);

/*
```

```
**    Highest point must be at least some fraction of the second highest
**    peak in the histogram.
*/
if (nin >= 3)  doheight(I_HEIGHT);

/*
**    Lowest point of the interval must not exceed a specified multiple
**    of the lowest point of the histogram.
*/
if (nin >= 3)  doabsmin(I_ABSMIN);

/* Transform inr into an interval set. */
intset = makeintset(hist);

/* Release local storage. */
free(inr);
return(intset);
} static INTSET *makeintset(hist)
  HISTOGRAM *hist;
{
  INTSET *intset;
  register int i,j;

/* Allocate the interval set. */
  intset = (INTSET *)malloc(sizeof(INTSET) + (nin*sizeof(INTERVAL)));
  if ((int)intset == 0) {
    fprintf("intset: Failed to allocate interval set.\n");
    return(0);
  }
  (intset->IS_size) = nin;

/*
  **    Store the intervals -- we have to chase down the links copying
  **    just the right intervals into 'intset'.
  */
  i = 0;
  j = 0;
  do {
     (intset->IS_elem[i]).I_min = inr[ inr[j].I_next ].I_left;
     (intset->IS_elem[i]).I_max = inr[ inr[j].I_next ].I_right;
     (intset->IS_elem[i]).I_label = NULL;
     i++;
     j = inr[j].I_next;
  } while (inr[j].I_next != 0);

/* Copy the associated feature name. */
  strncpy(intset->IS_file,hist->H_file,H_STRING);

/* Determine a score for this set of intervals */
  (intset->IS_score) = doscore();

/* Return the interval set. */
  return(intset);
}

/* getmm -- calculate max-min ratio for an interval record
 *
 * This routine calculates the max-min ratio for an interval
 * record and stores it in I_maxmin. This is the ratio of
 * the highest point in the interval (apex) to the higher of
 * the two shoulders (I_lside and I_rside). The ratio is
 * scaled to an integer by multiplication by 100 and ratios
```

```
 *   greater than 100 (10000) are stored as if they were 100.
 *   If both shoulders are 0, the score 10001 is stored.
 *
 * getmm (ir)
 * INREC *ir              pointer to interval record
 */ static getmm(ir)
    INREC *ir;
{
    /* Check for a perfect separation. */
    if ((ir->I_lside) == 0 && (ir->I_rside) == 0)
        ir->I_maxmin = 10001;
    else ir->I_maxmin = MIN(10000, (ir->I_lside > ir->I_rside)
                                    ? ((ir->I_apex) * 100) / (ir->I_lside)
                                    : ((ir->I_apex) * 100) / (ir->I_rside));
}

/* setupi -- initialize interval list
 *
 * setupi (hist)
 * HISTOGRAM *hist;     pointer to histogram
 */ static setupi(hist)
    HISTOGRAM *hist;
{
    int cutpnt, oldcut;
    int i;
    AREA barval, oldval;
    AREA s;

/* Set up the list header (0th interval). */
    inr[0].I_left = 0;
    inr[0].I_lside = 0;
    inr[0].I_right = 0;
    inr[0].I_rside = 0;
    inr[0].I_next = 1;
    inr[0].I_prev = 0;

/* Initial number of intervals. */
    nin = 1;
/* Locate the last zero element of an initial run of zeros. */
for (cutpnt = 0; (hist->H_val[cutpnt]) == 0; cutpnt++) ;
if (cutpnt > 0)  cutpnt--;

/* Set up the first interval record. */
inr[1].I_prev = 0;
inr[1].I_left = cutpnt;
inr[1].I_lside = 0;                     /* Was H_val[cutpoint] -- KIL */

/*
**  This loop stores the next interval, which consists of a relative
**  maximum (apex) followed by a relative minimum.  At the start of
**  the loop, "nin" is the number of the next interval to be stored.
**  For all intervals from 1 to nin-1, all fields have been set; for
**  interval nin, the "prev" and "lside" fields have been set.
*/ barval = hist->H_val[cutpnt];
do {
    /*
    **  Find the next peak (or the end of the histogram).
    */
```

```c
/* Start with the "apex" on 1st interval's left shoulder. */
oldcut = cutpnt;
oldval = barval;

/* Step right until past peak. */
while (barval >= oldval && cutpnt < hist->H_width ) {
  if (barval > oldval) {
    oldcut = cutpnt;
    oldval = barval;
  }

/* Update the bar height (with 0 to right of histogram). */
  barval = (++cutpnt < hist->H_width) ? hist->H_val[cutpnt] : 0;
}

/* Save the apex value. */
inr[nin].I_apex = oldval;

/*
**  Find the following minimum (or end).
*/

/* Move up to just past the peak. */
if (cutpnt < hist->H_width) {
  oldcut = cutpnt;
  oldval = barval;
}

/* Step right until past minimum. */
while ( barval <= oldval && cutpnt < hist->H_width ) {
  if (barval < oldval) {
    oldcut = cutpnt;
    oldval = barval;
  }

/* Update the bar height (with 0 to right of histogram). */
  barval = (++cutpnt < hist->H_width) ? hist->H_val[cutpnt] : 0;
}

/* Check for the end of the histogram. */
 if (cutpnt >= hist->H_width) {
   cutpnt = hist->H_width - 1;
   barval = 0;
 }

/* Store the minimum. */
 inr[nin].I_right = oldcut;
 inr[nin].I_rside = oldval;

/* Link to next interval. */
 if (cutpnt < hist->H_width - 1) {
   inr[nin].I_next = nin + 1;
   getmm (&inr[nin]);
   nin++;
   inr[nin].I_prev = nin - 1;
   inr[nin].I_left = oldcut + 1;
   inr[nin].I_lside = oldval;
 }
} while (cutpnt < hist->H_width - 1);

/* Set the final barval to 0 -- KIL. */
inr[nin].I_rside = 0;

/* Link to the header record. */
inr[nin].I_next = 0;
```

```
   getmm (&inr[nin]);
   inr[0].I_prev = nin;

/* find apex, interval areas */
   apex = 0;
   for (i=1; i < nin+1; i++) {
     s = 0;
     for (cutpnt=inr[i].I_left; cutpnt <= inr[i].I_right; cutpnt++) {
       s += hist->H_val[cutpnt];
       if (hist->H_val[cutpnt] > apex)   apex = hist->H_val[cutpnt];
     }
     inr[i].I_area = s;
   }
}

/* deli -- delete an interval
 *
 * This routine deletes an interval by merging it with a
 * neighboring interval.  The parameters describing the
 * new combined interval are placed in the record for the
 * leftmost of the two intervals merged, and all links are
 * updated to indicate that the rightmost interval no longer
 * exists.  NIN, the number of intervals, is updated.
 * The value returned is the index of the new, merged interval.
 */ static INTNO deli (i)
INTNO i;
{
   INTNO left, right, retval;
   /* delete the only interval */
   if (nin==1) {
       nin = 0;
       inr[0].I_next = 0;
       inr[0].I_prev = 0;
       retval = 0;
   }
/* delete interval i */
   else {
      if (inr[i].I_next == 0) {
         left = inr[i].I_prev;
         right = i;
      }
      else if (inr[i].I_prev == 0) {
         left = i;
         right = inr[i].I_next;
      }
      else if (inr[i].I_lside > inr[i].I_rside) {
         left = inr[i].I_prev;
         right = i;
      }
      else {
         left = i;
         right = inr[i].I_next;
      }
      inr[left].I_next = inr[right].I_next;
      inr[inr[left].I_next].I_prev = left;
      inr[left].I_right = inr[right].I_right;
      inr[left].I_rside = inr[right].I_rside;
      inr[left].I_area = inr[left].I_area + inr[right].I_area;
      if (inr[left].I_apex < inr[right].I_apex) {
         inr[left].I_apex = inr[right].I_apex;
      }
      getmm (&inr[left]);
      nin = nin - 1;
      retval = left;
```

```
  }
  return (retval);
}

/* domaxmin -- eliminate intervals with low max-min ratio
 *
 * domaxmin (konst)
 * int konst;     threshold value
 */ static domaxmin (konst)
int konst;
{
  INTNO i;

i = inr[0].I_next;
  while (i != 0) {
     if (inr[i].I_maxmin < konst) {
        i = deli (i);
     }
     else  i = inr[i].I_next;
  }
}

/* doarea -- eliminate intervals whose areas are too small
 *
 * This routine eliminates all intervals whose area is too
 * small, based on the criterion that it is either less than
 * a specified absolute minimum, or else that it is less than
 * some fraction of the size of the entire histogram.
 *
 * doarea (kabs,krel)
 * int kabs;    absolute minimum area
 * int krel;    percentage of histogram area
 */ static doarea (kabs,krel)
int kabs, krel;
{
  INTNO i;
  AREA tot, cutoff;

/* compute histogram area */ tot = 0;
  i = inr[0].I_next;

while (i != 0) {
     tot = tot + inr[i].I_area;
     i = inr[i].I_next;
  }

/* determine correct cutoff */
  cutoff = (tot * krel) / 100;
  if (cutoff < kabs)  cutoff = kabs;

/* delete intervals */
  i = inr[0].I_next;
  while (i != 0) {
     if (inr[i].I_area < cutoff) {
        i = deli (i);
     }
     else  i = inr[i].I_next;
  }
}
```

```
/* doheight -- eliminate intervals with low apexes
 *
 * This routine eliminates all intervals with apex less than
 * some fraction of the second highest apex of any interval
 * in the histogram.
 *
 * doheight (konst)
 * int konst;     threshold value
 */ static doheight (konst)
int konst;
{
   INTNO i;
   int cutoff;
   int x, apex1, apex2;

/* find second highest apex */
   apex1 = 0;
   apex2 = 0;
   i = inr[0].I_next;

while (i != 0) {
      x = inr[i].I_apex;
      if (x >= apex1) {
         apex2 = apex1;
         apex1 = x;
      }
      else if (x > apex2)  apex2 = x;
      i = inr[i].I_next;
   }

/* delete intervals */
   cutoff = apex2 * konst;
   i = inr[0].I_next;

while (i != 0) {
      if ((inr[i].I_apex * 100) <= cutoff) {
         i = deli (i);
      }
      else  i = inr[i].I_next;
   }
}

/* doabsmin -- eliminate intervals with one shoulder much larger
 * than the lowest current shoulder in the histogram.
 *
 * This routine eliminates all intervals whose higher edge is
 * greater than some fraction of the lowest histogram edge.
 *
 * doabsmin (konst)
 * int konst;
 */ static doabsmin(konst)
   int konst;
{
   INTNO i;
   AREA absmin, cutoff;

/*
   ** note: we only want to look at interior edges; so we have
   ** to avoid the leftmost and rightmost histogram edges.
   */
   i = inr[0].I_next;
```

```
   absmin = inr[i].I_rside;

/* Find the lowest min. */
while (inr[i].I_next != 0) {
   if (absmin > inr[i].I_rside) {
       absmin = inr[i].I_rside;
   }
   i = inr[i].I_next;
}

/*
** Clip the global min to be at least one.
**
** Otherwise a global min of 0 will eliminate
** all intervals without perfect scores.
**
** This is an SRI hack. -- KIL
*/
absmin = MAX(absmin,1);

/* Delete intervals which violate the heuristic. */
cutoff = absmin * konst;
i = inr[0].I_next;
while ((i != 0) && (inr[i].I_next != 0)) {
   if (inr[i].I_rside > cutoff) {
       i = deli (i);
   }
      else  i = inr[i].I_next;
   }
}

/* doscore -- assign a score to an interval set
 *
 * doscore ()
 * INTSET *iset;
 */ static int doscore ()
{
  INTNO i;
  int iscore, score;

if (nin < 2) {    /* require at least 2 intervals */.
    score = 1000.0 * (1.0 - 100.0/I_MAXMIN) + 0.5;
    return(score);
  } score = -1;
  iscore = -1;

for (i=inr[0].I_next; i != 0; i=inr[i].I_next) {
     if ((inr[i].I_lside == 0) && (inr[i].I_rside == 0))
        iscore = 1000;
     else if (inr[i].I_lside > inr[i].I_rside)
        iscore = ((inr[i].I_apex-inr[i].I_lside) * 1000) / inr[i].I_apex;
     else
        iscore = ((inr[i].I_apex-inr[i].I_rside) * 1000) / inr[i].I_apex;

if (iscore > 1000)  iscore = 1000;       /* Why bother? -- KIL */
     if (iscore > score)  score = iscore;     /* was < in Moose */
  } return (score);
}
```

```
/*
**  interval.h
**
**     Declarations for Phoenix histogram interval routines.
**
*/ typedef struct {
  int I_min, I_max;           /* interval limits */
  char *I_label;              /* interval name */
} INTERVAL;                   /* an interval */ typedef struct {
  char IS_file[H_STRING];     /* feature name */
  int  IS_size;               /* number of intervals */
  int  IS_score;              /* score for this set */
  INTERVAL IS_elem[1];        /* array of intervals */
} INTSET;                     /* an interval set */

/*
**  External declarations.
*/

INTSET *Imake();
#include <stdio.h>
#include <math.h>
include <strings.h> define  MAXFRMS 30 main(argc, argv)
     int   argc;
     char *argv[];
{
  int    j, k, nfrms, flag, wrkindex;
  char   statfile[80], wrkframe[10], framelist[MAXFRMS][10];
  float  featlist[MAXFRMS][50], dmin, dmax, distance;
  FILE   *fptr;

if (argc < 2 || strcmp(argv[1], "-help") == 0) {
    printf("Usage:  distance statfile -f frame\n");
    exit(0);
  } strcpy(statfile, argv[1]);
  flag = 0;
  if (argc == 4 && strcmp(argv[2], "-f") == 0) {
    flag = 1;
    strcpy(wrkframe, argv[3]);
  } nfrms = 0;
  fptr = fopen(statfile, "r");
  while (fscanf(fptr, "%s", framelist[nfrms]) != EOF) {
    for (j = 0; j < 4; j++) {
      fscanf(fptr, "%*s");
      for (k = 0; k < 12; k++)  fscanf(fptr, "%f", &featlist[nfrms][12*j+k]);
    }
    fscanf(fptr, "%*s %f %*s %f", &featlist[nfrms][48], &featlist[nfrms][49]);
    nfrms++;
  }
  fclose(fptr);

if (flag) {
    wrkindex = -1;
    for (j = 0; j < nfrms; j++)
```

```
    if (strcmp(wrkframe, framelist[j]) == 0)   wrkindex = j;
  if (wrkindex == -1) {
    printf("Error: No working frame in stat. file\n");
    exit(0);
  }
} for (k = 0; k < 50; k++) {
  dmin = dmax = featlist[0][k];
  for (j = 1; j < nfrms; j++) {
    if (featlist[j][k] < dmin)  dmin = featlist[j][k];
    else if (featlist[j][k] > dmax)   dmax = featlist[j][k];
  } if (dmin != dmax)
    for (j = 0; j < nfrms; j++)
      featlist[j][k] = (featlist[j][k] - dmin) / (dmax - dmin);
} if (flag) {
  for (j = 0; j < nfrms; j++)
    if (j != wrkindex) {
       distance = 0.0;
       for (k = 0; k < 50; k++)
         distance += fabs(featlist[j][k] - featlist[wrkindex][k]);
       printf("Distance between %s and %s is: %f\n",
              wrkframe, framelist[j], distance);
    }
}
  else
    for (wrkindex = 0; wrkindex < nfrms; wrkindex++) {
      printf("\n");
      for (j = 0; j < nfrms; j++)
        if (j != wrkindex) {
           distance = 0.0;
           for (k = 0; k < 50; k++)
             distance += fabs(featlist[j][k] - featlist[wrkindex][k]);
           printf("Distance between %s and %s is: %f\n",
                  framelist[wrkindex], framelist[j], distance);
        }
    }
}
```

Segmented Image Evaluation

```
#include "evaldef.h"
include <sig/sigdef.h> define LENGTH 80 main (argc,argv)
     int   argc;
     char *argv[];
{
  char  cmdpath[80], line[LENGTH], *valptr;
  char  bwpath[80], gtrpath[80], robpath[80], sobpath[80], segpath[80];
  int   fdbw, fdgtr, fdrob, fdsob, fdseg, ncols, nrows;
  int   gtrsize, gtrcmin, gtrcmax, gtrrmin, gtrrmax, rgnlabel;
  float pixelmisscore, overlapscore, contrastscore;
  float edgeborderscore, bounddiffscore;
  float pixelmisweight, overlapweight, contrastweight;
  float edgeborderweight, bounddiffweight, payoff;
  unsigned char *bwim, *gtrim, *robim, *sobim, *segim;
  FILE  *fptr;
```

```c
  /* get parameters from command line */
  if (argc < 3 || strcmp(argv[1],"-help") == 0) {
    printf("Usage:  evaluate segimg cmdfile\n");
    exit();
  } strcpy(segpath, argv[1]);
  strcpy(cmdpath, argv[2]);

pixelmisweight = overlapweight = contrastweight = 0.2;
  edgeborderweight = bounddiffweight = 0.2;

fptr = fopen(cmdpath, "r");

while ((valptr = fgets(line, LENGTH, fptr)) != NULL) {
    while (*valptr != '=')  valptr++;
    *valptr++ = '\0';

if (strcmp(line, "bwimg") == 0)
      sscanf(valptr, "%s", bwpath);
    else if (strcmp(line, "gtrimg") == 0)
      sscanf(valptr, "%s", gtrpath);
    else if (strcmp(line, "robimg") == 0)
      sscanf(valptr, "%s", robpath);
    else if (strcmp(line, "sobimg") == 0)
      sscanf(valptr, "%s", sobpath);
    else if (strcmp(line, "pixelmis") == 0)
      sscanf(valptr, "%f", &pixelmisweight);
    else if (strcmp(line, "overlap") == 0)
      sscanf(valptr, "%f", &overlapweight);
    else if (strcmp(line, "contrast") == 0)
      sscanf(valptr, "%f", &contrastweight);
    else if (strcmp(line, "edgeborder") == 0)
      sscanf(valptr, "%f", &edgeborderweight);
    else if (strcmp(line, "bounddiff") == 0)
      sscanf(valptr, "%f", &bounddiffweight);
    else {
      printf("Invalid keyword: %s\n\n", line);
      exit();
    }
  }

/* open the signal files */
mode = 1;
sigopen(&fdbw, bwpath, &ncomps, ndims, dimszs, pixszs, signs,
        &mode, &status);
if (status) {
  printf("Error from sigopen for path = %s\n\n", bwpath);
  exit();
} ncols = dimszs[0][0];
nrows = dimszs[0][1];

begend[0][0] = begend[1][0] = 0;
begend[0][1] = ncols - 1;
begend[1][1] = nrows - 1;
usrszs[0] = ncols;
usrszs[1] = nrows;
usrbits = pixszs[0];
bwim = (unsigned char *) malloc(ncols * nrows * sizeof(char));
sigread(&fdbw, &comp, begend, bwim, usrszs, &usrbits, &status);
sigclose(&fdbw, &status);

/* open ground truth target image. */
```

```
sigopen(&fdgtr, gtrpath, &ncomps, ndims, dimszs, pixszs, signs,
        &mode, &status);
if (status) {
  printf("Error from sigopen for path = %s\n\n", gtrpath);
  exit();
}
if (dimszs[0][0] != ncols || dimszs[0][1] != nrows || pixszs[0] != usrbits) {
  printf("Incorrect image spec of %s\n\n", gtrpath);
  exit();
} gtrim = (unsigned char *) malloc(ncols * nrows * sizeof(char));
sigread(&fdgtr, &comp, begend, gtrim, usrszs, &usrbits, &status);
sigclose(&fdgtr, &status);

/* open roberts edge image. */
sigopen(&fdrob, robpath, &ncomps, ndims, dimszs, pixszs, signs,
        &mode, &status);
if (status) {
  printf("Error from sigopen for path = %s\n\n", robpath);
  exit();
}
if (dimszs[0][0] != ncols || dimszs[0][1] != nrows || pixszs[0] != usrbits) {
  printf("Incorrect image spec of %s\n\n", robpath);
  exit();
} robim = (unsigned char *) malloc(ncols * nrows * sizeof(char));
sigread(&fdrob, &comp, begend, robim, usrszs, &usrbits, &status);
sigclose(&fdrob, &status);

/* open sobel edge image. */
sigopen(&fdsob, sobpath, &ncomps, ndims, dimszs, pixszs, signs,
        &mode, &status);
if (status) {
  printf("Error from sigopen for path = %s\n\n", sobpath);
  exit();
}
if (dimszs[0][0] != ncols || dimszs[0][1] != nrows || pixszs[0] != usrbits) {
  printf("Incorrect image spec of %s\n\n", sobpath);
  exit();
}
sobim = (unsigned char *) malloc(ncols * nrows * sizeof(char));
sigread(&fdsob, &comp, begend, sobim, usrszs, &usrbits, &status);
sigclose(&fdsob, &status);

/* open segmented image to be evaluated. */
sigopen(&fdseg, segpath, &ncomps, ndims, dimszs, pixszs, signs,
        &mode, &status);
if (status) {
  printf("Error from sigopen for path = %s\n\n", segpath);
  exit();
}
if (dimszs[0][0] != ncols || dimszs[0][1] != nrows || pixszs[0] != usrbits) {
  printf("Incorrect image spec of %s\n\n", segpath);
  exit();
} segim = (unsigned char *) malloc(ncols * nrows * sizeof(char));
sigread(&fdseg, &comp, begend, segim, usrszs, &usrbits, &status);
sigclose(&fdseg, &status);

pixelmis(gtrim, segim, ncols, nrows, >rsize,
         >rcmin, >rcmax, >rrmin, >rrmax, &rgnlabel, &pixelmisscore);
overlap(gtrim, segim, ncols, nrows, gtrsize,
        gtrcmin, gtrcmax, gtrrmin, gtrrmax, rgnlabel, &overlapscore);
```

```
   contrast(bwim, gtrim, segim, ncols, nrows, gtrsize,
          gtrcmin, gtrcmax, gtrrmin, gtrrmax, rgnlabel, &contrastscore);
   edgeborder(sobim, segim, ncols, nrows, &edgeborderscore);
   bounddiff(robim, segim, ncols, nrows, &bounddiffscore);

payoff = pixelmisscore * pixelmisweight + overlapscore * overlapweight
      + contrastscore * contrastweight + edgeborderscore * edgeborderweight
      + bounddiffscore * bounddiffweight;

printf("pixelmisscore = %f\n", 100.0 * pixelmisscore);
   printf("overlapscore = %f\n", 100.0 * overlapscore);
   printf("contrastscore = %f\n", 100.0 * contrastscore);
   printf("edgeborderscore = %f\n", 100.0 * edgeborderscore);
   printf("bounddiffscore = %f\n", 100.0 * bounddiffscore);
   printf("payoff = %f\n", 100.0 * payoff);

free(bwim);
   free(gtrim);
   free(robim);
   free(sobim);
   free(segim);

/* printf("gtrsize = %d, rgnlabel = %d\n", gtrsize, rgnlabel);
   printf("gtrcmin = %d, gtrcmax = %d, gtrrmin = %d, gtrrmax = %d\n",
          gtrcmin, gtrcmax, gtrrmin, gtrrmax);
   printf("rgncmin = %d, rgncmax = %d, rgnrmin = %d, rgnrmax = %d\n",
          rgncmin, rgncmax, rgnrmin, rgnrmax); */
}
   #include <stdio.h>
   #include <math.h>
   #include <malloc.h>
   #include <string.h> define  TARGET 255 include "evaldef.h"

bounddiff(gtrim, segim, ncols, nrows, goodness)
        unsigned char *gtrim, *segim;
        int   ncols, nrows;
        float *goodness;
{
   float grnthscore, matchscore, dmax, dist;
   int   i, j, k, l, found, row, col;
   int   boundary = 255, background = 0;
   unsigned char *edgim;

edgim = (unsigned char *) malloc(ncols * nrows * sizeof(char));
   edgeroberts(segim, edgim, ncols, nrows);

dmax = 10.0;
   grnthscore = matchscore = 0.0;
   for (i = 0; i < nrows; i++)
     for (j = 0; j < ncols; j++) {
       /* Compute exactly matched boundaries. */
       if (*(gtrim + i*ncols + j) == boundary
           && *(edgim + i*ncols + j) == boundary) {
         grnthscore += 1.0;
         matchscore += 1.0;
         *(gtrim + i*ncols + j) = background;
         *(edgim + i*ncols + j) = background;
       }
       /* Process adjacent boundary points. */
       else if (*(gtrim + i*ncols + j) == boundary) {
         grnthscore += 1.0;
         dist = dmax;
         found = 0;
         for (k = (int) -dist; k <= (int) dist; k++)
```

```c
          for (l = (int) -dist; l <= (int) dist; l++)
            if (i+k >= 0 && i+k < nrows && j+l >= 0 && j+l < ncols
                && *(edgim + (i+k)*ncols + (j+l)) == boundary
                && sqrt((double) (k*k + l*l)) < dist) {
              dist = sqrt((double) (k*k + l*l));
              row = i + k;
              col = j + l;
              found = 1;
            }
        /* Check if two points are nearest. */
        for (k = (int) -dist; found && k <= (int) dist; k++)
          for (l = (int) -dist; found && l <= (int) dist; l++)
            if (row+k >= 0 && row+k < nrows && col+l >= 0 && col+l < ncols
                && *(gtrim + (row+k)*ncols + (col+l)) == boundary
                && sqrt((double) (k*k + l*l)) < dist)
              found = 0;
        if (found) {
          matchscore += 0.1 * (dmax - dist);
          *(gtrim + i*ncols + j) = background;
          *(edgim + row*ncols + col) = background;
        }
      }
    } for (i = 0; i < nrows; i++)
    for (j = 0; j < ncols; j++)
      if (*(gtrim + i*ncols + j) == boundary) {
        dist = dmax;
        found = 0;
        for (k = (int) -dist; k <= (int) dist; k++)
          for (l = (int) -dist; l <= (int) dist; l++)
            if (i+k >= 0 && i+k < nrows && j+l >= 0 && j+l < ncols
                && *(edgim + (i+k)*ncols + (j+l)) == boundary
                && sqrt((double) (k*k + l*l)) < dist) {
              dist = sqrt((double) (k*k + l*l));
              row = i + k;
              col = j + l;
              found = 1;
            }
        if (found) {
          matchscore += 0.1 * (dmax - dist);
          *(gtrim + i*ncols + j) = background;
          *(edgim + row*ncols + col) = background;
        }
      } for (i = 0; i < nrows; i++)
    for (j = 0; j < ncols; j++)
      if (*(gtrim + i*ncols + j) == boundary
         || *(edgim + i*ncols + j) == boundary)   matchscore -= 0.5;

if (matchscore > 0.0) *goodness = matchscore / grnthscore;
  else  *goodness = 0.0;

free(edgim);
} edgeroberts(inimg, outimg, ncols, nrows)
     unsigned char *inimg, *outimg;
     int   ncols, nrows;
{
  int  i, j, m, n, dt1, dt2, threshold;
  static int  roberts[2][2][2] = {{{0, 1}, {-1, 0}}, {{1, 0}, {0, -1}}};

threshold = 1;
```

```c
      for (i = 0; i < nrows; i++)
        for (j = 0; j < ncols; j++, inimg++, outimg++) {
          if (i == nrows - 1)   *outimg = *(outimg - ncols);
          else if (j == ncols - 1)   *outimg = *(outimg - 1);
          else {
            dt1 = dt2 = 0;
            for (m = 0; m < 2; m++)
              for (n = 0; n < 2; n++) {
                dt1 += *(inimg + m*ncols + n) * roberts[0][m][n];
                dt2 += *(inimg + m*ncols + n) * roberts[1][m][n];
              } if (dt1*dt1 + dt2*dt2 >= threshold)   *outimg = 255;
            else  *outimg = 0;
          }
        }
}
#include "evaldef.h"

define  BGMARGIN  10 contrast(orgim, gtrim, segim, ncols, nrows, gtrsize,
         gtrcmin, gtrcmax, gtrrmin, gtrrmax, rgnlabel, contrastscore)
     unsigned char  *orgim, *gtrim, *segim;
     int   ncols, nrows, gtrsize, gtrcmin, gtrcmax, gtrrmin, gtrrmax, rgnlabel;
     float  *contrastscore;
{
  int  i, j, tgtforsum, tgtbacksum, tgtbackpix;
  int  rgnforsum, rgnbacksum, rgnforpix, rgnbackpix;
  float  foravgint, backavgint, gtrcontrast, segcontrast;

if (rgnlabel < 0) {
    *contrastscore = 0.0;
    return;
  } gtrcmin -= BGMARGIN;
  gtrrmin -= BGMARGIN;
  gtrcmax += BGMARGIN;
  gtrrmax += BGMARGIN;
  if (gtrcmin < 0)   gtrcmin = 0;
  if (gtrrmin < 0)   gtrrmin = 0;
  if (gtrcmax >= ncols)   gtrcmax = ncols - 1;
  if (gtrrmax >= nrows)   gtrrmax = nrows - 1;

tgtforsum = tgtbacksum = 0;
  rgnforsum = rgnbacksum = 0;
  tgtbackpix = rgnforpix = rgnbackpix = 0;

for (i = gtrrmin; i <= gtrrmax; i++)
    for (j = gtrcmin; j <= gtrcmax; j++) {
      if (*(gtrim + i*ncols + j) == TARGET)
        tgtforsum += *(orgim + i*ncols + j);
      else {
        tgtbackpix++;
        tgtbacksum += *(orgim + i*ncols + j);
      } if (*(segim + i*ncols + j) == rgnlabel) {
        rgnforpix++;
        rgnforsum += *(orgim + i*ncols + j);
      }
      else {
        rgnbackpix++;
        rgnbacksum += *(orgim + i*ncols + j);
      }
    }
```

```
    foravgint = (float) tgtforsum / gtrsize;
    backavgint = (float) tgtbacksum / tgtbackpix;
    gtrcontrast = (foravgint - backavgint) / foravgint;

foravgint = (float) rgnforsum / rgnforpix;
    backavgint = (float) rgnbacksum / rgnbackpix;
    segcontrast = (foravgint - backavgint) / foravgint;

if (gtrcontrast * segcontrast < 0.0)
       segcontrast = gtrcontrast - segcontrast;

if (fabs(gtrcontrast) > fabs(segcontrast))
       *contrastscore = segcontrast / gtrcontrast;
       else  *contrastscore = gtrcontrast / segcontrast;
    }
#include "evaldef.h"

edgeborder(sobim, segim, ncols, nrows, edgeborderscore)
     unsigned char  *sobim, *segim;
     int    ncols, nrows;
     float  *edgeborderscore;
{
  int   i, j, sobpixels, hitpixels;
  unsigned char   *edgim, *edgtmp;

edgim = (unsigned char *) malloc(ncols * nrows * sizeof(char));
  edgeroberts(segim, edgim, ncols, nrows);

edgtmp = edgim;
  sobpixels = hitpixels = 0;
  for (i = 0; i <= nrows; i++)
     for (j = 0; j <= ncols; j++, sobim++, edgtmp++) {
        if (*sobim == 255 && *edgtmp == 255) {
           sobpixels++;
           hitpixels++;
        }
        else if (*sobim == 255)   sobpixels++;
     }

*edgeborderscore = (float) hitpixels / sobpixels;

free(edgim);
}
#include "evaldef.h"
overlap(gtrim, segim, ncols, nrows, gtrsize,
        gtrcmin, gtrcmax, gtrrmin, gtrrmax, rgnlabel, overlapscore)
     unsigned char  *gtrim, *segim;
     int    ncols, nrows, gtrsize, gtrcmin, gtrcmax, gtrrmin, gtrrmax, rgnlabel;
     float  *overlapscore;
{
  int   hit, i, j;

if (rgnlabel < 0) {
     *overlapscore = 0.0;
     return;
  } hit = 0;
  for (i = gtrrmin; i <= gtrrmax; i++)
     for (j = gtrcmin; j <= gtrcmax; j++)
        if (*(gtrim + i*ncols + j) == TARGET
           && *(segim + i*ncols + j) == rgnlabel)
          hit++;

*overlapscore = (float) hit / gtrsize;

}
```

```c
#include "evaldef.h"

pixelmis(gtrim, segim, ncols, nrows, gtrsize,
         gtrcmin, gtrcmax, gtrrmin, gtrrmax, rgnlabel, pixelmisscore)
    unsigned char  *gtrim, *segim;
    int    ncols, nrows, *gtrsize;
    int    *gtrcmin, *gtrcmax, *gtrrmin, *gtrrmax, *rgnlabel;
    float  *pixelmisscore;
{
  int    i, j, col, row, label, hit, miss;
  short  stack[1024][2], top;
  float  score, maxscore;
  unsigned char  *tmpim;

*gtrsize = 0;
  *gtrcmin = ncols;
  *gtrrmin = nrows;
  *gtrcmax = *gtrrmax = 0;
  tmpim = (unsigned char *) malloc(ncols * nrows * sizeof(char));
  for (i = 0; i < nrows; i++)
    for (j = 0; j < ncols; j++) {
      if (*(gtrim + i*ncols + j) == TARGET) {
        (*gtrsize)++;
        if (j < *gtrcmin)  *gtrcmin = j;
        if (j > *gtrcmax)  *gtrcmax = j;
        if (i < *gtrrmin)  *gtrrmin = i;
        if (i > *gtrrmax)  *gtrrmax = i;
      }
      *(tmpim + i*ncols + j) = 0;
    } maxscore = -1.0;
  for (i = *gtrrmin; i <= *gtrrmax; i++)
    for (j = *gtrcmin; j <= *gtrcmax; j++)
      if (*(gtrim + i*ncols + j) == TARGET && *(tmpim + i*ncols + j) == 0) {
        label = *(segim + i*ncols + j);
        hit = miss = 0;
        top = 0;
        stack[top][0] = i;
        stack[top][1] = j;

while (top >= 0) {
          row = stack[top][0];
          col = stack[top][1];
          top--;

if (*(tmpim + row*ncols + col) == 0) {
            while (col > 0 && *(segim + row*ncols + (col-1)) == label)
              col--;

*(tmpim + row*ncols + col) = 1;
            if (*(gtrim + row*ncols + col) == TARGET)  hit++;
            else   miss++;

if (row > 0 && *(tmpim + (row-1)*ncols + col) == 0
                && *(segim + (row-1)*ncols + col) == label) {
              top++;
              stack[top][0] = row - 1;
              stack[top][1] = col;
            }
            else if (row > 0 && col > 0
                    && *(tmpim + (row-1)*ncols + (col-1)) == 0
                    && *(segim + (row-1)*ncols + (col-1)) == label) {
              if (score > maxscore) {
                maxscore = score;
                *rgnlabel = label;
              }
```

```
      }
    if (maxscore < 0.0) {
      *pixelmisscore = 0.0;
      *rgnlabel = -1;
    }
    else   *pixelmisscore = maxscore;
    free(tmpim);
}
      top++;
      stack[top][0] = row - 1;
      stack[top][1] = col - 1;
    } if (row < nrows - 1 && *(tmpim + (row+1)*ncols + col) == 0
        && *(segim + (row+1)*ncols + col) == label) {
      top++;
      stack[top][0] = row + 1;
      stack[top][1] = col;
    }
    else if (row < nrows - 1 && col > 0
             && *(tmpim + (row+1)*ncols + (col-1)) == 0
             && *(segim + (row+1)*ncols + (col-1)) == label) {
      top++;
      stack[top][0] = row + 1;
      stack[top][1] = col - 1;
    } while (col < ncols - 1
           && *(segim + row*ncols + (col+1)) == label) {
      col++;
      *(tmpim + row*ncols + col) = 1;
      if (*(gtrim + row*ncols + col) == TARGET)   hit++;
      else   miss++;

if (row > 0 && *(tmpim + (row-1)*ncols + col) == 0
          && *(segim + (row-1)*ncols + col) == label
          && *(segim + (row-1)*ncols + (col-1)) != label) {
        top++;
        stack[top][0] = row - 1;
        stack[top][1] = col;
      } if (row < nrows - 1 && *(tmpim + (row+1)*ncols + col) == 0
          && *(segim + (row+1)*ncols + col) == label
          && *(segim + (row+1)*ncols + (col-1)) != label) {
        top++;
        stack[top][0] = row + 1;
        stack[top][1] = col;
      }
    } if (row > 0 && col < ncols - 1
        && *(tmpim + (row-1)*ncols + (col+1)) == 0
        && *(segim + (row-1)*ncols + (col+1)) == label
        && *(segim + (row-1)*ncols + col) != label) {
      top++;
      stack[top][0] = row - 1;
      stack[top][1] = col + 1;
    } if (row < nrows - 1 && col < ncols -1
        && *(tmpim + (row+1)*ncols + (col+1)) == 0
        && *(segim + (row+1)*ncols + (col+1)) == label
        && *(segim + (row+1)*ncols + col) != label) {
      top++;
```

```
            stack[top][0] = row + 1;
            stack[top][1] = col + 1;
        }                                       - 69 -
    }
} score = (float) (hit - miss) / *gtrsize;
bwimg=img/suby
gtrimg=img/gtrtgt
robimg=img/gtredg
sobimg=img/sobedg
pixelmis=0.2
overlap=0.2
contrast=0.2
edgeborder=0.2
bounddiff=0.2
#include <stdio.h>
#include <math.h>
#include <malloc.h>
#include <string.h>
#include "/src/sip/include/sig/sigdef.h"

#define ROBERTS 1
define SOBEL   2 main (argc, argv)
    int argc;
    char *argv[];
{
  int    i, operator, threshold, impose, ncols, nrows;
  long int  fdin, fdout;
  char   inpath[80], outpath[80];
  unsigned char  *inimg, *outimg;

if (argc < 3 || strcmp(argv[1], "-help") == 0) {
    printf("Usage: edge insigpath outsigpath -roberts -t {1} -impose\n");
    printf("                                 -sobel\n");
    exit(0);
  } operator = ROBERTS;
  threshold = 1;
  impose = 0;
  i = 0;
  while (++i < argc) {
    if (i == 1)
      strcpy(inpath, argv[i]);
    else if (i == 2)
      strcpy(outpath, argv[i]);
    else if (strcmp(argv[i], "-roberts") == 0)
      operator = ROBERTS;
    else if (strcmp(argv[i], "-sobel") == 0)
      operator = SOBEL;
    else if (strcmp(argv[i], "-t") == 0)
      threshold = atoi(argv[++i]);
    else if (strcmp(argv[i], "-impose") == 0)
      impose = 1;
    else {
      printf("edge: unrecognized parameter %s.\n\n", argv[i]);
      exit(0);
    }
  }
} mode = 1;
  sigopen(&fdin, inpath, &ncomps, ndims, dimszs, pixszs, signs,
          &mode, &status);
```

```
  if (status) {
    printf("Error from sigopen for %s.\n", inpath);
    exit(0);
  } ncols = dimszs[0][0];
  nrows = dimszs[0][1];

begend[0][0] = begend[1][0] = 0;
  begend[0][1] = ncols - 1;
  begend[1][1] = nrows - 1;
  usrszs[0] = ncols;
  usrszs[1] = nrows;
  usrbits = pixszs[0];
  inimg = (unsigned char *) malloc(ncols * nrows * sizeof(char));
  sigread(&fdin, &comp, begend, inimg, usrszs, &usrbits, &status);
  sigclose(&fdin, &status);

outimg = (unsigned char *) malloc(ncols * nrows * sizeof(char));
  if (operator == ROBERTS)
    roberts(inimg, outimg, ncols, nrows, threshold, impose);
  else
    sobel(inimg, outimg, ncols, nrows, threshold, impose);

mode = 0;
  sigopen(&fdout, outpath, &ncomps, ndims, dimszs, pixszs, signs,
        &mode, &status);
  if (status) {
    printf("Error from sigopen for %s.\n", outpath);
    exit(0);
  } sigwrite(&fdout, &comp, begend, outimg, usrszs, &usrbits, &status);
  sigclose(&fdout, &status);

free(inimg);
  free(outimg);
} roberts(inimg, outimg, ncols, nrows, threshold, impose)
     unsigned char *inimg, *outimg;
     int   ncols, nrows, threshold, impose;
{
  int    i, j, m, n, dt1, dt2;
  static int   roberts[2][2][2] = {{{0, 1}, {-1, 0}}, {{1, 0}, {0, -1}}};

threshold *= threshold;
  for (i = 0; i < nrows; i++)
    for (j = 0; j < ncols; j++, inimg++, outimg++) {
      if (i == nrows - 1)  *outimg = *(outimg - ncols);
      else if (j == ncols - 1)  *outimg = *(outimg - 1);
      else {
        dt1 = dt2 = 0;
        for (m = 0; m < 2; m++)
          for (n = 0; n < 2; n++) {
            dt1 += *(inimg + m*ncols + n) * roberts[0][m][n];
            dt2 += *(inimg + m*ncols + n) * roberts[1][m][n];
          } if (impose) {
          if (dt1*dt1 + dt2*dt2 >= threshold)   *outimg = 0;
          else   *outimg = *inimg;
        }
        else {
```

```
            if (dt1*dt1 + dt2*dt2 >= threshold)   *outimg = 255;
            else  *outimg = 0;
          }
        }
      }
    }
  } sobel(inimg, outimg, ncols, nrows, threshold, impose)
      unsigned char  *inimg, *outimg;
      int   ncols, nrows, threshold, impose;
{
  int   dt1, dt2, i, j, m, n;
  static int   sobel[2][3][3] = {{{-1, 0, 1}, {-2, 0, 2}, {-1, 0, 1}},
                                 {{1, 2, 1}, {0, 0, 0}, {-1, -2, -1}}};

threshold *= threshold;
  for (i = 0; i < nrows; i++)
    for (j = 0; j < ncols; j++, inimg++, outimg++) {
      if (i > 0 && i < nrows - 1 && j > 0 && j < ncols - 1) {
        dt1 = dt2 = 0;
        for (m = -1; m <= 1; m++)
          for (n = -1; n <= 1; n++) {
            dt1 += *(inimg + m*ncols + n) * sobel[0][m+1][n+1];
            dt2 += *(inimg + m*ncols + n) * sobel[1][m+1][n+1];
          } if (impose) {
          if (dt1*dt1 + dt2*dt2 >= threshold)   *outimg = 0;
          else  *outimg = *inimg;
        }
        else {
          if (dt1*dt1 + dt2*dt2 >= threshold)   *outimg = 255;
          else  *outimg = 0;
        }
      }
      else if (impose)   *outimg = *inimg;
      else   *outimg = 0;
    }
}
  #include <stdio.h>
  #include <math.h>
  #include <malloc.h>
  #include <string.h>
  #include <sig/sigdef.h> main (argc, argv)
       int argc;
       char *argv[];
  {
    int   fdin, fdout, ncols, nrows;
    char  inpath[80], outpath[80];
    unsigned char  *inimg, *outimg;

if (argc < 3 || strcmp(argv[1], "-help") == 0) {
      printf("Usage: noiseclean insigpath outsigpath\n");
      exit();
    } strcpy(inpath, argv[1]);
    strcpy(outpath, argv[2]);

mode = 1;
    sigopen(&fdin, inpath, &ncomps, ndims, dimszs, pixszs, signs,
            &mode, &status);
```

```
    if (status) {
      printf("Error from sigopen for %s.\n", inpath);
      exit();
    } ncols = dimszs[0][0];
    nrows = dimszs[0][1];

inimg = (unsigned char *) malloc(ncols * nrows * sizeof(char));
    outimg = (unsigned char *) malloc(ncols * nrows * sizeof(char));

begend[0][0] = begend[1][0] = 0;
    begend[0][1] = ncols - 1;
    begend[1][1] = nrows - 1;
    usrszs[0] = ncols;
    usrszs[1] = nrows;
    usrbits = pixszs[0];
    sigread(&fdin, &comp, begend, inimg, usrszs, &usrbits, &status);
    if (status) {
      printf("Error from sigread for %s.\n", inpath);
      exit();
    } sigclose(&fdin, &status);
    if (status) {
      printf("Error from sigclose for %s.\n", inpath);
      exit();
    } noiseclean(inimg, outimg, ncols, nrows);

mode = 0;
    sigopen(&fdout, outpath, &ncomps, ndims, dimszs, pixszs, signs,
            &mode, &status);
    if (status) {
      printf("Error from sigopen for %s.\n", outpath);
      exit();
    } sigwrite(&fdout, &comp, begend, outimg, usrszs, &usrbits, &status);
    if (status) {
      printf("Error from sigwrite for %s.\n", outpath);
      exit();
    } sigclose(&fdout, &status);
    if (status) {
      printf("Error from sigclose for %s.\n", outpath);
      exit();
    } free(inimg);
    free(outimg);
} noiseclean(inimg, outimg, ncols, nrows)
     unsigned char  *inimg, *outimg;
     int   ncols, nrows;
{
  int   subhist[9][2], flag, maxfreq, newpixval;
  int   i, j, k, l, m;

for (i = 0; i < nrows; i++)
    for (j = 0; j < ncols; j++, inimg++, outimg++) {
      for (m = 0; m < 9; m++) {
```

```
          subhist[m][0] = -1;      /* pixel value */
          subhist[m][1] = 0;       /* pixel count */
      } for (k = -1; k <= 1; k++)
        for (l = -1; l <= 1; l++)
          if (i+k >= 0 && i+k < nrows && j+l >= 0 && j+l < ncols) {
            flag = 1;
            for (m = 0; flag && m < 9; m++)
              if (subhist[m][0] == -1
                  || subhist[m][0] == *(inimg + k*ncols +l)) {
                subhist[m][0] = *(inimg + k*ncols + l);
                subhist[m][1]++;
                flag = 0;
              }
          } maxfreq = 0;
      for (m = 0; m < 9; m++)
        if (subhist[m][1] > maxfreq
            || subhist[m][0] == *inimg && subhist[m][1] == maxfreq) {
          newpixval = subhist[m][0];
          maxfreq = subhist[m][1];
        }
      *outimg = newpixval;
    }
}
```

Genetic Learning System

```
#include "ais.h"
#include "aisdef.h"

main(argc, argv)
     int   argc;
     char *argv[];
{
  int    i, numgen;
  int    MAXGEN, MAXDECREASE, MAXUNIMPROVE, MINAFTERNEW;
  char   statfile[80], popfile[80];
  FILE   *fstatp, *fpoptr;

if (argc < 3 || strcmp(argv[1], "-help") == 0) {
    printf("Usage:   adapseg statfile popfile -indoor {-outdoor} -test {-train}\n");
    printf("             -indoor = for indoor images.\n");
    printf("                       [default: outdoor images]\n");
    printf("             -test = for image testing.\n");
    printf("                       [default: image training]\n");
    exit(0);
  } strcpy(statfile, argv[1]);
  strcpy(popfile, argv[2]);

MAXGEN = 50;
  MAXDECREASE = 3;
  MAXUNIMPROVE = 5;
  MINAFTERNEW = 5;
  i = 2;
  while (++i < argc) {
    if (strcmp(argv[i], "-indoor") == 0)  threshold = 99.0;
    else if (strcmp(argv[i], "-outdoor") == 0)  threshold = 95.0;
    else if (strcmp(argv[i], "-test") == 0) {
      MAXDECREASE = 2;
      MAXUNIMPROVE = 3;
```

```c
    MINAFTERNEW = 3;
  }
  else if (strcmp(argv[i], "-train") == 0) {
    MAXDECREASE = 3;
    MAXUNIMPROVE = 5;
    MINAFTERNEW = 5;
  }
  else {
    printf("adapseg: unrecognized parameter %s.\n", argv[i]);
    exit(0);
  }
} printf("Experiment:");
initialize();
interface();
statistics();

printf("Generation: 0   avg. fitness = %f   maxfitness = %f\n",
       avgfitness, maxfitness);
/* printout(); */ fstatp = fopen(statfile, "w");
fprintf(fstatp, "%10.6f %2d %2d %10.6f\n",
        avgfitness, maxind.hsmooth, maxind.maxmin, maxind.fitness);

numgen = 0;
while (maxfitness < threshold && numgen < MAXGEN
       && (numdecreased < MAXDECREASE && numunimproved < MAXUNIMPROVE
           || numafternew < MINAFTERNEW)}
  numgen++;
  generate();
  interface();
  statistics();
  /*** printout(); ***/
  fprintf(fstatp, "%10.6f %2d %2d %10.6f\n",
          avgfitness, maxind.hsmooth, maxind.maxmin, maxind.fitness);
}
fclose(fstatp);

printf("Generation: %d   avg. fitness = %f   maxfitness = %f\n",
       numgen, avgfitness, maxfitness);
printf("Segmentation: %d   Crossover: %d   Mutation: %d\n",
       nsegments, ncrossover, nmutation);

fpoptr = fopen(popfile, "w");
for (i = 0; i < MAXPOP; i++)
  fprintf(fpoptr, "%2d %2d %10.6f\n",
          pop[i].hsmooth, pop[i].maxmin, pop[i].fitness);
fclose(fpoptr);
}
int  nsegments = 0,
     ncrossover = 0,
     nmutation = 0,
     numdecreased = 0,
     numunimproved = 0,
     numafternew = 0;

float  threshold = 95.0,     /* indoor: 99.0, outdoor: 95.0 */
       pcrossover = 0.8,
       avgfitness = 0.0,
       maxfitness = 0.0,
       maxavg = 0.0;

objfunc    payoff[HSSIZE][MMSIZE];
individual pop[MAXPOP], maxind;
```

```c
#include <stdio.h>
#include <math.h>
include <string.h> define MAXPOP      10
define STRINGLEN   10
#define HSMOOTH      5
#define HSSIZE      32
define MMSIZE      32 define MASK        16
define OLD          0
#define NEW          1
#define FALSE        0
define TRUE         1 typedef struct {
  char  visited;
  float fitness;
} objfunc;

typedef struct {
  char  newold;
  char  chrom[STRINGLEN+1];
  int   hsmooth, maxmin;
  float fitness;
  int   parent1, parent2, xsite, msite;
} individual;

double  my_random();

extern int    nsegments, ncrossover, nmutation;
extern int    numdecreased, numunimproved, numafternew;
extern float  threshold, pcrossover;
extern float  avgfitness, maxfitness, maxavg;
extern objfunc  payoff[HSSIZE][MMSIZE];
extern individual  pop[MAXPOP], maxind;
#include "ais.h"

generate()
{
  register int  i;
  int   choices[MAXPOP], mate1, mate2, index;
  float oldmin;
  individual  tmppop[MAXPOP];

preselect(choices);
  for (i = 0; i < MAXPOP; i += 2) {
    remainselect(choices, MAXPOP-i, &mate1, &mate2);
    crossover(mate1, mate2, &tmppop[i], &tmppop[i+1]);
  } for (i = 0; i < MAXPOP; i++) {
    string2value(&tmppop[i]);
    pop[i] = tmppop[i];
  } if (maxfitness == 0.0)  return;

index = -1;
  oldmin = 100.0;
  for (i = 0; i < MAXPOP; i++) {
    if (strcmp(pop[i].chrom, maxind.chrom) == 0)  return;
    else if (pop[i].newold == OLD) {
      if (pop[i].fitness >= maxfitness)  return;
      else if (pop[i].fitness < oldmin) {
```

```
            oldmin = pop[i].fitness;
            index = i;
          }
        }
      } if (index < 0)   index = my_random() * MAXPOP;
      pop[index] = maxind;
      pop[index].newold = OLD;
      pop[index].parent1 = pop[index].parent2 = 0;
      pop[index].xsite = pop[index].msite = 0;
}
include "ais.h"

initialize()
{
  register int   i, j;
  int   seed;
  long int   time();
  FILE   *fptr;

if ((fptr = fopen("seed.init", "r")) != NULL) {
    fscanf(fptr, "%d", &seed);
    fclose(fptr);
  }
  else   seed = time((long int *) 0);

printf("   seed = %d\n", seed);
  srandom(seed);

if ((fptr = fopen("payoff.init", "r")) != NULL) {
    for (i = 0; i < HSSIZE; i++)
      for (j = 0; j < MMSIZE; j++) {
        fscanf(fptr, "%f", &payoff[i][j].fitness);
        payoff[i][j].visited = FALSE;
      }
    fclose(fptr);
  }
  else {
    printf("ERROR: Payoff.init File does not exist.\n");
    exit(0);
  } if ((fptr = fopen("para.init", "r")) != NULL) {
    for (i = 0; i < MAXPOP; i++) {
      pop[i].newold = NEW;
      pop[i].fitness = 0.0;
      pop[i].parent1 = pop[i].parent2 = 0;
      pop[i].xsite = pop[i].msite = 0;
      fscanf(fptr, "%d %d %*f", &pop[i].hsmooth, &pop[i].maxmin);
      value2string(&pop[i]);
    }
    fclose(fptr);
  }
  else {
    for (i = 0; i < MAXPOP; i++) {
      pop[i].newold = NEW;
      pop[i].fitness = 0.0;
      pop[i].parent1 = pop[i].parent2 = 0;
      pop[i].xsite = pop[i].msite = 0;
      pop[i].hsmooth = my_random() * HSSIZE;
      pop[i].maxmin = my_random() * MMSIZE;
      value2string(&pop[i]);
    }
  }
}
```

```
printout()
{
  register int  i;

printf("   N/O Chromosome Hs Mm  Parent  X   M    Fitness\n");
  for (i = 0; i < MAXPOP; i++)
    printf("%2d   %1d   %s   %2d  %2d  %2d %2d  %2d %2d %10.6f\n",
           i+1, pop[i].newold, pop[i].chrom, pop[i].hsmooth, pop[i].maxmin,
           pop[i].parent1, pop[i].parent2, pop[i].xsite, pop[i].msite,
           pop[i].fitness);
}

/********************************
sortpop()
{
  register int  i, j;
  individual   tmpind;

for (i = 0; i < MAXPOP-1; i++)
    for (j = MAXPOP-1; j > i; j--)
      if (pop[j].fitness > pop[j-1].fitness) {
        tmpind = pop[j];
        pop[j] = pop[j-1];
        pop[j-1] = tmpind;
      }
}
*********************************/ include "ais.h"

interface()
{
  register int  i;

for (i = 0; i < MAXPOP; i++) {
    pop[i].fitness = payoff[pop[i].hsmooth][pop[i].maxmin].fitness;
    if (payoff[pop[i].hsmooth][pop[i].maxmin].visited == FALSE) {
      nsegments++;
      payoff[pop[i].hsmooth][pop[i].maxmin].visited = TRUE;
    }
  }
} include "ais.h"

value2string(ind)
     individual  *ind;
{
  register int  j;

for (j = 0; j < HSMOOTH; j++) {
    if (ind->hsmooth & (MASK >> j))  ind->chrom[j] = '1';
    else  ind->chrom[j] = '0';
  } for (j = HSMOOTH; j < STRINGLEN; j++) {
    if (ind->maxmin & (MASK >> j-HSMOOTH))  ind->chrom[j] = '1';
    else  ind->chrom[j] = '0';
  } ind->chrom[STRINGLEN] = '\0';
} string2value(ind)
     individual  *ind;
{
  register int  j;
```

```c
  ind->hsmooth = 0;
  for (j = 0; j < HSMOOTH; j++)
    if (ind->chrom[j] == '1')  ind->hsmooth |= MASK >> j;

ind->maxmin = 0;
  for (j = HSMOOTH; j < STRINGLEN; j++)
    if (ind->chrom[j] == '1')  ind->maxmin |= MASK >> j-HSMOOTH;
} statistics()
{
  register int i;
  float  preavg, premax;

preavg = avgfitness;
  premax = maxfitness;

avgfitness = maxfitness = pop[0].fitness;
  maxind = pop[0];
  for (i = 1; i < MAXPOP; i++) {
    avgfitness += pop[i].fitness;
    if (pop[i].fitness > maxfitness) {
      maxfitness = pop[i].fitness;
      maxind = pop[i];
    }
    else if (pop[i].fitness == maxfitness) {
      if (pop[i].hsmooth < maxind.hsmooth)   maxind = pop[i];
      else if (pop[i].hsmooth == maxind.hsmooth
              && pop[i].maxmin < maxind.maxmin)  maxind = pop[i];
    }
  }
  avgfitness /= MAXPOP;

if (avgfitness < preavg)  numdecreased++;      /* decreased */
  else  numdecreased = 0;

if (avgfitness < maxavg)  numunimproved++;     /* not improved */
  else {
    maxavg = avgfitness;
    numunimproved = 0;
  } if (maxfitness > premax)  numafternew = 0;     /* found new max. */
  else  numafternew++;
} define  DENOM  2147483648.0 double my_random()
{
  long int   rnum, random();

rnum = random();
  return((double) rnum / DENOM);
}
include "ais.h"

preselect(choices)
     int   choices[];
{
  register int  j, k;
  int   jassign;
  float  fraction[MAXPOP];

if (avgfitness == 0.0) {
```

```
      for (k = 0; k < MAXPOP; k++)  choices[k] = k;
      return;
   } j = k = 0;
   while (j < MAXPOP) {
     jassign = pop[j].fitness / avgfitness;
     fraction[j] = pop[j].fitness / avgfitness - jassign;
     while (jassign-- > 0)  choices[k++] = j;
     j++;
   } j = 0;
   while (k < MAXPOP) {
     if (j >= MAXPOP)  j = 0;
     if (my_random() < fraction[j]) {
       choices[k++] = j;
       fraction[j] -= 1.0;
     }
     j++;
   }
} remainselect(choices, nremain, mate1, mate2)
     int  choices[], nremain, *mate1, *mate2;
{
  register int  j;
  int  jpick, done;

jpick = my_random() * nremain;
  *mate1 = choices[jpick];
  choices[jpick] = choices[--nremain];

do {
    jpick = my_random() * nremain;
    done = TRUE;
    if (choices[jpick] == *mate1) {
      for (j = 0; j < nremain; j++)
        if (choices[j] != *mate1)  done = FALSE;
    }
  } while (done == FALSE);

*mate2 = choices[jpick];
  choices[jpick] = choices[nremain-1];
} crossover(mate1, mate2, child1, child2)
     int  mate1, mate2;
     individual  *child1, *child2;
{
  register int  i;
  int  begsur, endsur, surrogate[STRINGLEN], npoints, cpick, crosspoint;
  individual  parent1, parent2;
  parent1 = pop[mate1];
  parent2 = pop[mate2];

if (my_random() < pcrossover) {
    begsur = endsur = -1;
    for (i = 0; i < STRINGLEN; i++)
      if (parent1.chrom[i] != parent2.chrom[i]) {
        if (begsur == -1)  begsur = i;
        endsur = i;
      } if (begsur != endsur) {
      npoints = endsur - begsur;
```

```
    for (i = 0; i < npoints; i++)  surrogate[i] = begsur + i + 1;
    child1->msite = child2->msite = 0;

do {
      cpick = my_random() * npoints;
      crosspoint = surrogate[cpick];

for (i = 0; i < crosspoint; i++) {
        child1->chrom[i] = parent1.chrom[i];
        child2->chrom[i] = parent2.chrom[i];
      }
      for (i = crosspoint; i < STRINGLEN; i++) {
        child1->chrom[i] = parent2.chrom[i];
        child2->chrom[i] = parent1.chrom[i];
      }
      string2value(child1);
      string2value(child2);

if (payoff[child1->hsmooth][child1->maxmin].visited == FALSE
         || payoff[child2->hsmooth][child2->maxmin].visited == FALSE)
        npoints = 0;
      else {
        surrogate[cpick] = surrogate[--npoints];
        if (npoints == 0) {
          mutation(child1);
          mutation(child2);
        }
      }
    } while (npoints > 0);

child1->newold = child2->newold = NEW;
    child1->parent1 = child2->parent1 = mate1 + 1;
    child1->parent2 = child2->parent2 = mate2 + 1;
    child1->xsite = child2->xsite = crosspoint;
    child1->chrom[STRINGLEN] = child2->chrom[STRINGLEN] = '\0';
    ncrossover++;
  } else {
    *child1 = parent1;
    *child2 = parent2;
    child1->newold = child2->newold = NEW;
    child1->parent1 = child2->parent1 = 0;
    child1->parent2 = child2->parent2 = 0;
    child1->xsite = child2->xsite = 0;
    mutation(child1);
    mutation(child2);
  }
} else {
    *child1 = parent1;
    *child2 = parent2;
    child1->newold = child2->newold = OLD;
    child1->parent1 = child2->parent1 = 0;
    child1->parent2 = child2->parent2 = 0;
    child1->xsite = child2->xsite = 0;
    child1->msite = child2->msite = 0;
  }
} mutation(ind)
    individual *ind;
{
  register int i;
```

```
int    npoints, checkmute[STRINGLEN], mpick, mutepoint;

npoints = STRINGLEN;
for (i = 0; i < npoints; i++)   checkmute[i] = i;

do {
    mpick = my_random() * npoints;
    mutepoint = checkmute[mpick];

if (ind->chrom[mutepoint] == '0')  ind->chrom[mutepoint] = '1';
    else   ind->chrom[mutepoint] = '0';
    string2value(ind);

if (payoff[ind->hsmooth][ind->maxmin].visited == FALSE)
      npoints = 0;
    else {
       checkmute[mpick] = checkmute[--npoints];
       if (npoints > 0) {
          if (ind->chrom[mutepoint] == '0')   ind->chrom[mutepoint] = '1';
          else   ind->chrom[mutepoint] = '0';
       }
    }
} while (npoints > 0);

ind->msite = mutepoint + 1;
nmutation++;
}
```

We claim:

1. An adaptive image segmentation system comprising:
   an image analyzer;
   a genetic learning system connected to said image analyzer;
   an image segmenter connected to said genetic learning system; and
   segmented image evaluator connected to said image segmenter and to said genetic learning system.

2. Apparatus of claim 1 wherein:
   said image analyzer has an input for images and has an output for image statistics;
   said genetic learning system has a first input for image statistics, a second input for external variables, an output for control parameters and a third input;
   said image segmenter having a first input for images, a second input for control parameters and an output for segmented images; and
   said segmented image evaluator having an input for segmented images, and an output for segmentation quality indications, connected to the third input of said genetic learning system.

3. Apparatus of claim 2 wherein: the image statistics are measurements by said image analyzer of properties of the images;
   the external variables are environmental factors under which the images are acquired;
   the control parameters are segmentation parameters; and
   the segmentation quality indications are utilized for initiating adaptation to incoming images which is based on differences in characteristics of previously analyzed and of images currently being analyzed.

4. Apparatus of claim 3 wherein said image analyzer, said genetic learning system, said image segmenter and said segmented image evaluator are a computer workstation having a central processing unit and a memory.

5. Apparatus of claim 4 further comprising:
   an image database connected to said computer workstation;
   a video digitizing system connected to said image database; and
   a video camera connected to said video digitizing system.

6. An adaptive segmentation system comprising:
   analyzing means for producing image statistics that measure characteristics of incoming images;
   genetic learning means, connected to said analyzing means, for determining appropriate control parameters from the image statistics, from observed external variables, and from segmentation evaluation results; and
   segmentation means, connected to said genetic learning means, for segmenting the images, evaluating segmented images, and for providing segmentation evaluation results to said genetic learning means, wherein if said genetic learning means does not accept the evaluation results then said segmentation means segmenting images again provides evaluation results to said genetic learning means in a reiterative fashion until said genetic learning means accepts the evaluation results and in turn accepts the control parameters in response to the evaluation results.

7. A method of adaptation image segmentation comprising:
   analyzing acquiring input images; the input images to obtain image statistics that are measurements of characteristics of the input images;

obtaining external variables that are environmental factors under which the input images are acquired;

determining appropriate control parameters by a genetic learning algorithm from the image statistics, from the external variables and from an accepted set of segmentation evaluation results;

segmenting input images in accordance with the control parameters;

evaluating segmented images; and obtaining a set of segmentation evaluation results from said evaluating segmented images.

8. Method of claim 7 further comprising the step of providing the set of segmentation evaluation results for acceptance for said determining appropriate control parameters, wherein if the set of segmentation evaluation results is not accepted then said segmenting input images, said evaluating segmented images, said obtaining a set of segmentation evaluation results, and providing the set of segmentation evaluation results for acceptance for said determining appropriate control parameters are again performed in a reiterative fashion until acceptance for said determining appropriate control parameters.

* * * * *

UNITED STATES PATENT AND TRADEMARK OFFICE
CERTIFICATE OF CORRECTION

PATENT NO. : 5,048,095

DATED : September 10, 1991

INVENTOR(S) : Bir Bhanu, Sungkee Lee, John C. Ming

It is certified that error appears in the above-identified patent and that said Letters Patent is hereby corrected as shown below:

Column 87, line 62, insert after of -- images --

Column 88, line 64, cancel "acquiring"

Column 88, line 64, cancel "; the input images"

Signed and Sealed this

Twentieth Day of April, 1993

Attest:

MICHAEL K. KIRK

*Attesting Officer*     Acting Commissioner of Patents and Trademarks